(12) United States Patent
Hussey, Jr. et al.

(10) Patent No.: US 10,242,104 B2
(45) Date of Patent: Mar. 26, 2019

(54) DISTRIBUTED PERSONAL INFORMATION AGGREGATOR

(75) Inventors: Michael P. Hussey, Jr., New York, NY (US); Pavel A. Baranov, Bronx, NY (US); Terrence E. McArdle, New York, NY (US); Timothy M. Boesenberg, Johnston, IA (US); Baldev Duggal, New York, NY (US)

(73) Assignee: PeekAnalytics, Inc., New York, NY (US)

( * ) Notice: Subject to any disclaimer, the term of this patent is extended or adjusted under 35 U.S.C. 154(b) by 385 days.

(21) Appl. No.: 12/384,098

(22) Filed: Mar. 31, 2009

(65) Prior Publication Data
US 2010/0010993 A1    Jan. 14, 2010

Related U.S. Application Data

(60) Provisional application No. 61/072,497, filed on Mar. 31, 2008.

(51) Int. Cl.
*G06F 17/30* (2006.01)

(52) U.S. Cl.
CPC .............................. *G06F 17/30867* (2013.01)

(58) Field of Classification Search
CPC ......... G06F 17/30867; G06F 17/30964; G06F 17/30861; G06F 17/30241; G06F 17/30828; G06F 17/30864; G06F 17/30598; G06F 17/3087; G06F 17/30038; G06F 17/30041; G06F 17/30268; G06F 17/30554; G06F 17/30702; G06F 17/30979
USPC ................................................. 707/722, 769
See application file for complete search history.

(56) References Cited

U.S. PATENT DOCUMENTS

| | | | |
|---|---|---|---|
| 6,526,411 B1 * | 2/2003 | Ward | 707/999.102 |
| 6,571,279 B1 * | 5/2003 | Herz | G06F 17/30867 |
| | | | 707/999.01 |
| 6,651,217 B1 * | 11/2003 | Kennedy | G06F 17/243 |
| | | | 715/224 |
| 6,757,740 B1 | 6/2004 | Parekh et al. | |

(Continued)

OTHER PUBLICATIONS

"Wink, a place to flirt—and prowl", *VentureBeat*, Nov. 10, 2006, http://venturebeat.com/2006/11/10/wing-a-place-to-flirt-and-prowl/, 2 pages.

(Continued)

*Primary Examiner* — Ashish Thomas
*Assistant Examiner* — Rezwanul Mahmood
(74) *Attorney, Agent, or Firm* — Christensen, Fonder, Dardi & Herbert PLLC

(57) ABSTRACT

A method of aggregating personal information available from public sources over a network. The method includes the steps of receiving at a computer server, data associated with a person, the data being publicly available over a network, and including at least a first name and a last name; using a processor to compare the received data to a plurality of data profiles stored in a database of one or more memory devices, each profile corresponding to a previously-profiled person and containing data associated with the previously-profiled person; determining whether the received data sufficiently matches data associated with the previously-profiled person of the data profile; and merging the received data with the data associated with the previously-profiled person.

19 Claims, 22 Drawing Sheets

(56) References Cited

U.S. PATENT DOCUMENTS

| | | | |
|---|---|---|---|
| 6,983,282 B2 | 1/2006 | Stern et al. | |
| 6,985,926 B1* | 1/2006 | Ferlauto | G06F 17/30303 707/999.006 |
| 7,031,961 B2 | 4/2006 | Pitkow et al. | |
| 7,054,886 B2 | 5/2006 | Stern et al. | |
| 7,197,531 B2 | 3/2007 | Anderson | |
| 7,249,123 B2 | 7/2007 | Elder et al. | |
| 7,280,957 B2 | 10/2007 | Newman et al. | |
| 7,707,413 B2* | 4/2010 | Lunt | H04L 63/102 713/168 |
| 2002/0059251 A1* | 5/2002 | Stern | G06F 17/30864 707/999.01 |
| 2002/0091568 A1* | 7/2002 | Kraft | G06Q 30/02 705/14.58 |
| 2002/0120846 A1* | 8/2002 | Stewart | G06Q 20/04 713/168 |
| 2003/0167253 A1* | 9/2003 | Meinig | G06F 17/30303 707/999.001 |
| 2003/0177132 A1* | 9/2003 | Thomas | G06Q 10/10 707/999.1 |
| 2003/0212654 A1* | 11/2003 | Harper | G06Q 30/02 707/999.001 |
| 2003/0233336 A1* | 12/2003 | Clark | G06F 17/30876 707/999.001 |
| 2004/0111478 A1* | 6/2004 | Gross | H04L 51/00 709/206 |
| 2004/0117385 A1* | 6/2004 | Diorio | G06F 17/27 707/999.1 |
| 2005/0021666 A1* | 1/2005 | Dinnage | H04W 4/00 709/217 |
| 2005/0075950 A1* | 4/2005 | Lewis | G06Q 10/06 705/28 |
| 2005/0097150 A1* | 5/2005 | McKeon | G06F 17/30592 707/999.202 |
| 2005/0246238 A1* | 11/2005 | Dvorak | G06Q 30/06 705/26.9 |
| 2005/0283614 A1* | 12/2005 | Hardt | H04L 63/0823 713/182 |
| 2006/0015451 A1* | 1/2006 | Heyer | G06Q 20/10 705/39 |
| 2006/0036966 A1 | 2/2006 | Yevdayev | |
| 2006/0044635 A1* | 3/2006 | Suzuki | G06F 17/30265 358/527 |
| 2006/0059128 A1 | 3/2006 | Ruggle et al. | |
| 2006/0065716 A1* | 3/2006 | Peters | G06Q 10/087 235/380 |
| 2006/0143161 A1* | 6/2006 | Munro | G06F 17/30864 707/999.003 |
| 2006/0190564 A1* | 8/2006 | Arnold | H04L 67/306 709/219 |
| 2006/0218003 A1* | 9/2006 | Snyder | G06Q 10/00 705/313 |
| 2006/0245641 A1* | 11/2006 | Viola | G06F 17/2715 382/155 |
| 2006/0277103 A1* | 12/2006 | Fujita | G06Q 30/02 705/14.53 |
| 2006/0288087 A1 | 12/2006 | Sun | |
| 2007/0038664 A1* | 2/2007 | Jonas | G06F 17/30592 707/999.102 |
| 2007/0038698 A1* | 2/2007 | Peterson | H04L 29/06 709/203 |
| 2007/0061882 A1* | 3/2007 | Mukhopadhyay et al. | 726/23 |
| 2007/0130126 A1 | 6/2007 | Lucovsky et al. | |
| 2007/0192122 A1* | 8/2007 | Routson | G06Q 30/02 705/1.1 |
| 2007/0208613 A1 | 9/2007 | Backer | |
| 2007/0219966 A1* | 9/2007 | Baylis | G06F 17/30864 707/999.003 |
| 2007/0282887 A1 | 12/2007 | Fischer et al. | |
| 2007/0299856 A1* | 12/2007 | McKeon | G06F 17/30592 707/999.101 |
| 2008/0005106 A1* | 1/2008 | Schumacher | G06F 17/30489 707/999.006 |
| 2008/0052102 A1* | 2/2008 | Taneja | G06Q 10/063 705/7.11 |
| 2008/0133677 A1* | 6/2008 | Pattabhiraman | G06Q 10/00 709/206 |
| 2008/0140711 A1* | 6/2008 | Hyder et al. | 707/104.1 |
| 2008/0176583 A1* | 7/2008 | Brachet | G01S 5/0236 455/456.3 |
| 2008/0177704 A1* | 7/2008 | Denney | G06F 17/30522 707/999.003 |
| 2008/0244008 A1* | 10/2008 | Wilkinson | G06F 17/30545 709/205 |
| 2009/0012933 A1* | 1/2009 | Verini, Jr. | G06Q 90/00 707/999.003 |
| 2009/0031006 A1* | 1/2009 | Johnson | H04W 76/11 709/218 |
| 2009/0037396 A1* | 2/2009 | Uematsu | G06F 17/30864 707/999.004 |
| 2009/0064144 A1* | 3/2009 | Abhyanker | G06F 17/30241 718/100 |
| 2009/0070289 A1* | 3/2009 | Churi | G06Q 30/02 707/999.002 |
| 2009/0094237 A1* | 4/2009 | Churi | G06Q 30/02 707/999.006 |
| 2009/0106273 A1* | 4/2009 | Petri | G06F 17/30867 707/999.1 |
| 2009/0171690 A1* | 7/2009 | Lubarski | G06F 17/3089 705/342 |
| 2009/0193035 A1* | 7/2009 | Benayon et al. | 707/100 |
| 2009/0216435 A1* | 8/2009 | Zheng | G06F 17/3087 701/533 |
| 2009/0282002 A1* | 11/2009 | Reeder et al. | 707/3 |
| 2010/0010993 A1* | 1/2010 | Hussey, Jr. | G06F 17/30867 707/E17.005 |
| 2010/0011422 A1* | 1/2010 | Mason | G06F 21/33 726/5 |
| 2010/0049736 A1* | 2/2010 | Rolls et al. | 707/104.1 |
| 2010/0274815 A1* | 10/2010 | Vanasco | G06F 17/30867 707/798 |
| 2012/0303430 A1* | 11/2012 | Tiku | G06O 30/0207 705/14.17 |
| 2012/0323963 A1* | 12/2012 | Snapp | G06F 17/30286 707/769 |
| 2013/0137464 A1* | 5/2013 | Kramer | G06Q 30/02 455/456.3 |
| 2013/0219298 A9* | 8/2013 | Whalin | G06F 17/30964 715/753 |
| 2014/0236946 A1* | 8/2014 | Abhyanker | H04W 4/21 707/737 |

OTHER PUBLICATIONS

"People Search & Directory Services Powered by Intelius", *Intelius Live in the Know*, http://www.intelius.com/privacy-faq.php, Feb. 16, 2006, 4 pages.

"SiliconBeat: Riya supersizes plan: will become a "visual" search engine", *The Mercury News*, http://www.siliconbeat.com/entries/2006/06/15/riya_supersizes_plan_will_become_a_visual, Jun. 15, 2006, 2 pages.

"BusinessWeek Online Integrates ZoomInfo People Search; Researching Newsmakers Made Fast with 26 Million People Summaries Searchable from BusinessWeek.com Site", *Business Week*, http://findarticles.com/p/articles/mi_m0EIN/is_2005_August_9/ai_n14873252/?tag=content, Aug. 9, 2005, 2 pages.

* cited by examiner

BACKEND TECHNOLOGY

Fig. 15

250 —▶ peeks today: 25 | recall peeks: 582 | last posted by: joy2be | profile history | report abuse

John Doe

254 — 1. Fill out your information
256 — Your First Name [First]
258 — Your Middle Name [Middle]
260 — Your Last Name [Last]
252 —▶ Your Email [example@example]
262 — Your Homepage [http://]
264 — Your Location [Argentina]
266 — City, State [City, State]
268 — Your Gender [Male ▼]
270 — Your Age [12 ▼]
272 — Your Relationship [    ]

2. Type your message. A confirmation will be sent to your email address.
Compose Message
[                    ]
[Send Message]

— 274

DISTRIBUTED PERSONAL INFORMATION AGGREGATOR

RELATED APPLICATION

This application claims the benefit of U.S. Provisional Application No. 61/072,497 filed Mar. 31, 2008 and entitled "Computerized User Interface Supporting Distributed Personal Information Aggregator," which is incorporated herein in its entirety by reference.

FIELD OF THE INVENTION

The invention relates generally to apparatuses, systems, and methods of aggregating and analyzing publicly available data. More specifically, the invention relates to automatic aggregation of information on individuals, distributed across multiple Internet-linked sources.

BACKGROUND OF THE INVENTION

Computer search technologies have become a mainstay for quickly retrieving information contained within the Internet or the World Wide Web. The initial search engines merely consisted of a database of links that could be searched based on a select number of keywords that were associated with each listing. As search technology has advanced, new technologies have been produced that present to the user information that is more than just a listing of links associated with keywords. Some of the latest technologies rank the popularity of each URL by examining the number of other URLs that contain hyperlinks to that particular URL in the search result. This allows the search to rank the results according to number of links "in," creating a sort of popularity ranking. Searching algorithms such as these allow for the partial analysis and dissemination of the billions of webpages available on the Internet today, and for a prioritized display of the search results according to their relative relevance.

The rise of the information levels contained within the Internet has been mirrored by a rise in the number of users and persons creating pages for, creating personas in, and generally utilizing the web. Thus, not only is there a great deal of information on the Internet, but there is a great deal of personal information on the Internet. However, currently there is no way to determine, with certainty, the pages owned by, created by, or associated with an internet user. Personal information potentially correlated with the owner, creator, developer, or other persons associated with a given webpage may be greatly dispersed and difficult to identify and/or integrate. For example, if an end-user wanted to find all webpages created by a specific web developer, they would have to engage in several independent searches and look through each entry in a list of search results. Within each entry, a user would have to view the source of the page, or manually examine data tags in order to determine whether the page was created by that developer. Thus, the end-user will have to contend with a long search-result list, plethora of webpages, and their associated source-information in order to estimate whether the pages are created by the same person. This process is confounded by the fact that there could be two persons of the same name creating pages, thus leaving the user with no way of discerning the differences between the creators.

As a result, there exists a need for better aggregation of personal information distributed over the Internet that may be related to individuals associated with a given webpage.

SUMMARY

In one embodiment, the present invention comprises a method for aggregating over a network personal information available from public sources. The method includes the steps of receiving at a computer server, data associated with a person, the data being publicly available over a network, and including at least a first name and a last name; comparing the received data to a plurality of data profiles stored in a database of one or more memory devices, each profile corresponding to a previously-profiled person and containing data associated with that previously-profiled person; determining whether the received data sufficiently matches data associated with the previously-profiled person of the data profile; and merging the received data with the data associated with the previously-profiled person.

BRIEF DESCRIPTION OF THE DRAWINGS

The invention may be more completely understood in consideration of the following detailed description of various embodiments of the invention, in connection with the accompanying drawings, in which:

FIG. 15 is a graphical representation of a personal messaging system, according to an embodiment of the present invention;

Figure 1:
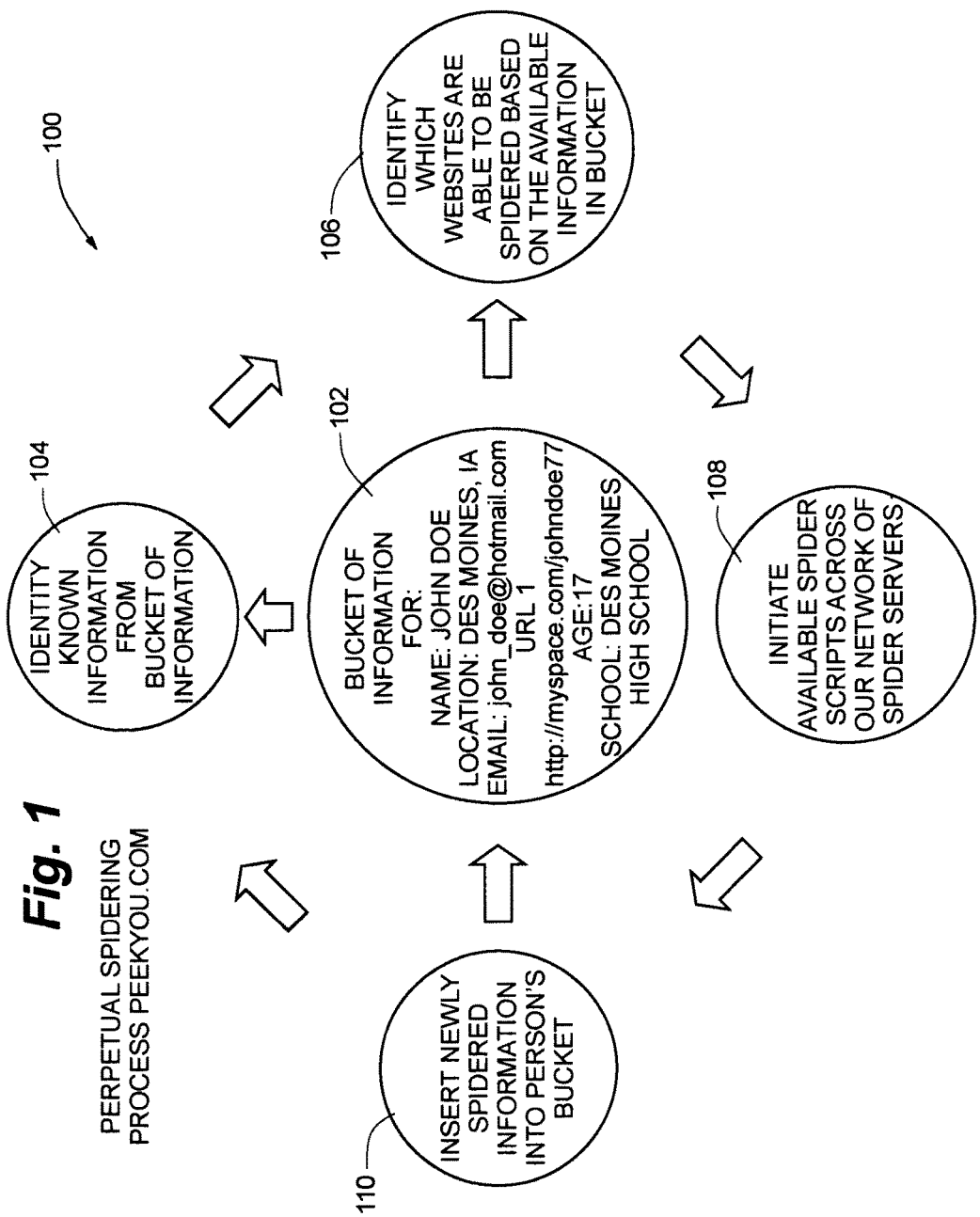
FIG. 1 is a diagram of the distributed personal information aggregation system, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention enables the intelligent linking of any public web data point or URL to the specific individual it is associated with, creating a database of people and the links associated with them. By linking public web data points and URLs to individuals in this fashion, the present invention creates a comprehensive directory of all Internet users that tracks every individual's online presence. Additionally, certain embodiments of the present invention allow for efficient searching and communication with people on the Internet.

Referring to FIG. 1, in one embodiment, a distributed personal information aggregation system (DPIAS) 100 includes several interrelated stages of aggregation. A database entry or "bucket" 102 is created for each user of the Internet. It will be understood that the term "bucket" may refer generally to a database entry, record, or other data, or collection of data comprising a database. It will also be understood that the term "user" refers to users of the Internet, users of DPIAS 100, and any other persons having a presence on the Internet or World Wide Web. Bucket 102 includes a user profile 103. User profile 103 includes personal information relating to a user. Multiple buckets 102 and their respective profiles 103 comprise a database 134 of stored profiles 103 (see also FIGS. 2 and 3). Database 134 may comprise any of known architectures and/or schemes. Further, personal information comprising user profile 103 is information generally available through public sources such as Internet websites, though profiles 103 may also comprise information input directly into database 134 via automated or manual means.

A computer implemented validator 104 identifies information that is valid from each user's bucket 102, or profile 103. In one embodiment of the present invention, a website identifier 106 determines a set of websites that may contain additional personal information based on information available in each user's bucket 102. In another embodiment of the present invention, a script initializer 108 automatically determines the relevant scripts to initialize for additional personal information retrieval from websites identified by the website identifier 106. An information associator 110 associates data returned by the scripts initialized by the script initializer 108 with the relevant user's bucket 102.

In one embodiment of the present invention, the bucket 102 is utilized to contain all information related to each user that is present on the Internet, namely user profile 103. Information contained within each user's bucket 102 and user profile 103 may include but is not limited to URLs of websites created by a user, referencing a user, or owned by a user.

As will be described in further detail below with respect to FIGS. 4-6, in one embodiment of the present invention, the information associator 110 utilizes data-matching techniques to ensure information in the user bucket 100 belongs to the user. The associator 110 utilizes different data matching techniques for each type of information of profile 103. In one embodiment of the present invention, returned data is matched based on email address. In another embodiment of the present invention, data is matched based on unique username and age.

In another embodiment of the present invention the data is matched based on unique username, city and state to ensure information belongs to specific individuals living within a specific known geographic location. Retrieved information may be matched based on the population of the city versus the expected number of people that have that name (e.g. it is highly unlikely that there is more than one Johnson Wales in Bozeman, Mont., though it is likely that there may be several such individuals having that name living in Chicago). In one embodiment of the present invention, where there are repeated names, other data including, but not limited to, age, middle name, unique username and email address may be utilized to ensure correct association of retrieved data with user bucket 100.

In one embodiment of the present invention, the association confidence score is set to at least 99.5%

In another embodiment of the present invention the associator 110 can take any two pieces of data and output a confidence score that indicates the likelihood that the information belongs to the same person.

In another embodiment of the present invention the DPIAS 100 is able to identify, obtain and associate information from websites such as YouTube®, MeetUp, eBay®, Infospace®, Switchboard®, PlentyOfFish®, Tagworld®, Faceparty®, RateMyTeachers, RateMyProfessors, Forbes, WAYN, Twitter, LiveJournal, Xanga, Yahoo®, MySpace®, Friendster®, Flickr™, Bebo, LinkedIn®, and Hi5®. One having skill in the art will recognize that the DPIAS 100 is flexible enough to obtain information from any websites that contain personally identifiable information that can be parsed.

In another embodiment of the present invention the validator 104 is run independently to validate and/or process information contained in user buckets 102. In yet another embodiment the DPIAS 100 doesn't utilize the validation process in information retrieval. In this embodiment, DPIAS 100 utilizes the website identifier 106, script initializer process 108 and the information associator 110. In this embodiment the validator 104 may be utilized at a later time to validate information contained in a user's bucket 102.

Figure 2:
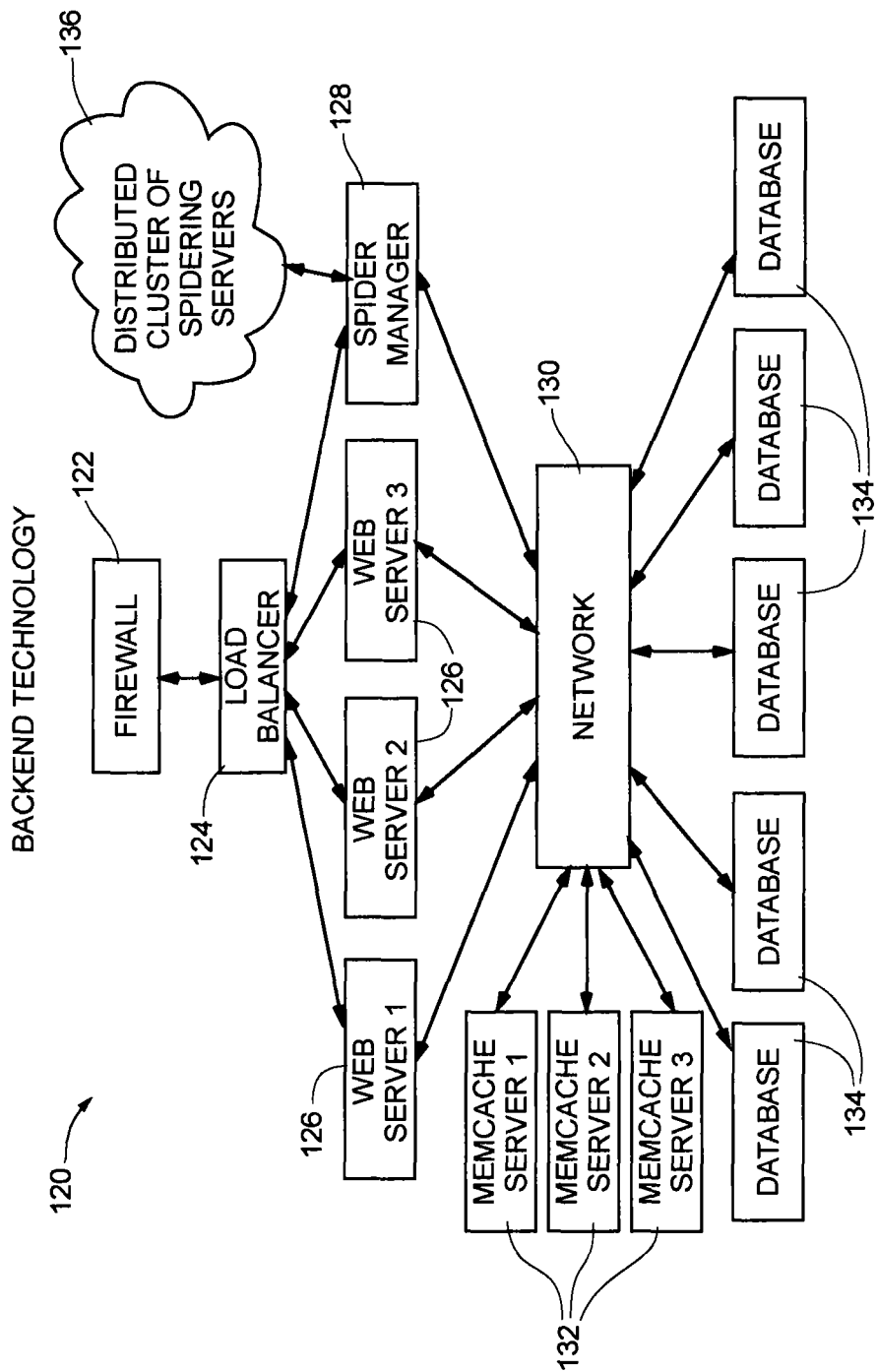
FIG. 2 is a diagram of the computer hardware infrastructure of the distributed personal information aggregation system, according to an embodiment of the present invention.

Referring to FIG. 2, in one embodiment of the present invention the DPIAS 100 is implemented on, and includes, a system of computer hardware 120. This system of computer hardware or hardware infrastructure may include: a firewall 122, a load balancer 124, a web server 126, a spider manager 128, an internal network 130, a memcache server 132, a database servers 134a with databases 134 and a distributed cluster of spidering servers 136. System 120 may also include one or more microprocessors especially adapted to perform the algorithms, steps, and processes comprising DPIAS 100 as described in further detail below. One having skill in the art will recognize that the computer infrastructure may contain one or several of each of the above listed hardware components in order to maintain flexibility and meet system demands. Specifically, in one embodiment of the present invention the system of computer hardware 120 includes a single firewall 122, load balancer 124, and spider manager 128 and a plurality of web servers 126, a plurality of memcache servers 132 and a plurality of database servers 134a, storing databases 134.

In one embodiment of the present invention each spidering server in the distributed cluster of spidering servers 136 is in a different geographical location in order to increase the coverage and performance of the DPIAS 100.

In one example, there exists a webpage located at URL http://johndoe.com/aboutus.html. This URL contains relevant information about a person, John Doe. The URL indicates that John Doe is located in, San Francisco, Calif., and is associated with Stanford University and the National Association of Biology Teachers. The URL also has other information about John Doe including that he was in the Navy and has his PhD in biology.

In this example, the script initializer 108 instructs a spidering server in the cluster of spidering servers 136 to load and process URL http://wwwjohndoe.com/about.html. The spidering server then scans the text of the URL seeking first and last name combinations of users stored within the DPIAS 100. Spidering server finds "John Doe" in the text of the scanned URL, which is a first and last name combination known to the DPIAS 100. Next, the spidering server scans for additional information relating to John Doe and finds his location, San Francisco, and his associated institutions, Stanford and the National Association of Biology Teachers.

The spidering server then scans the URL for additional keywords that provide additional information about the user and finds Navy and PhD. The information associator 110 then scans user profiles 103 for possible matching individuals based on information extracted from the URL including, but not limited to, name, location, keywords, institution names, proximity, tags, and education. Information associator 110 then determines whether information extracted from the URL matches a user in the DPIAS 100 with a high degree of certainty utilizing one or more data matching techniques. The information associator 110 then adds URL and additional information such as tags, images, or demographic information to user bucket 110. At this step the information aggregation from the specified URL is complete, and the spidering server is ready to investigate a new URL and repeat the process.

In another example, a digital image file is located at URL http://www.exampleurl.com/photos/jdoe.jpg. The digital image file is a personal image of John Doe taken at a local restaurant. The digital image file also contains metadata describing general data about the image. Such a file may be in EXIF format which provides additional information specific to the digital image file. The digital image file EXIF data may include, but is not limited to, information relating to geographic location, exposure, date and time, resolution, and camera make and model. Geographic location data may include latitude, longitude, and altitude.

In one embodiment of the present invention, a spidering server in the cluster of spidering servers 136 loads and processes URL http://www.exampleurl.com/photos/jdoe.jpg. The spidering server scans the EXIF information of the digital image file for metadata relating to geographic location, including but not limited to longitude and latitude. The spidering server then extracts the geographic location information from the digital image file. The information associator 110 then scans the DPIAS 100 user buckets 102 for possible matching individuals based on the geographic information extracted from the digital image file.

The information associator 110 then determines whether the information extracted from the digital image file matches a user within the DPIAS 100 to a high degree of certainty using data matching techniques. In this example, if the geographic information extracted from the digital image file falls within a radius of 10 to 20 meters from a user's home geographic location stored within the user bucket 102, there is a high likelihood that the image is associated with that specific user. The information associator 110 then adds the URL of the digital image file to the user bucket 102 and database 134. At this step, information extraction from the digital image file located at the specified URL is complete and the spidering server loads another URL and the process may repeat.

Figure 3:
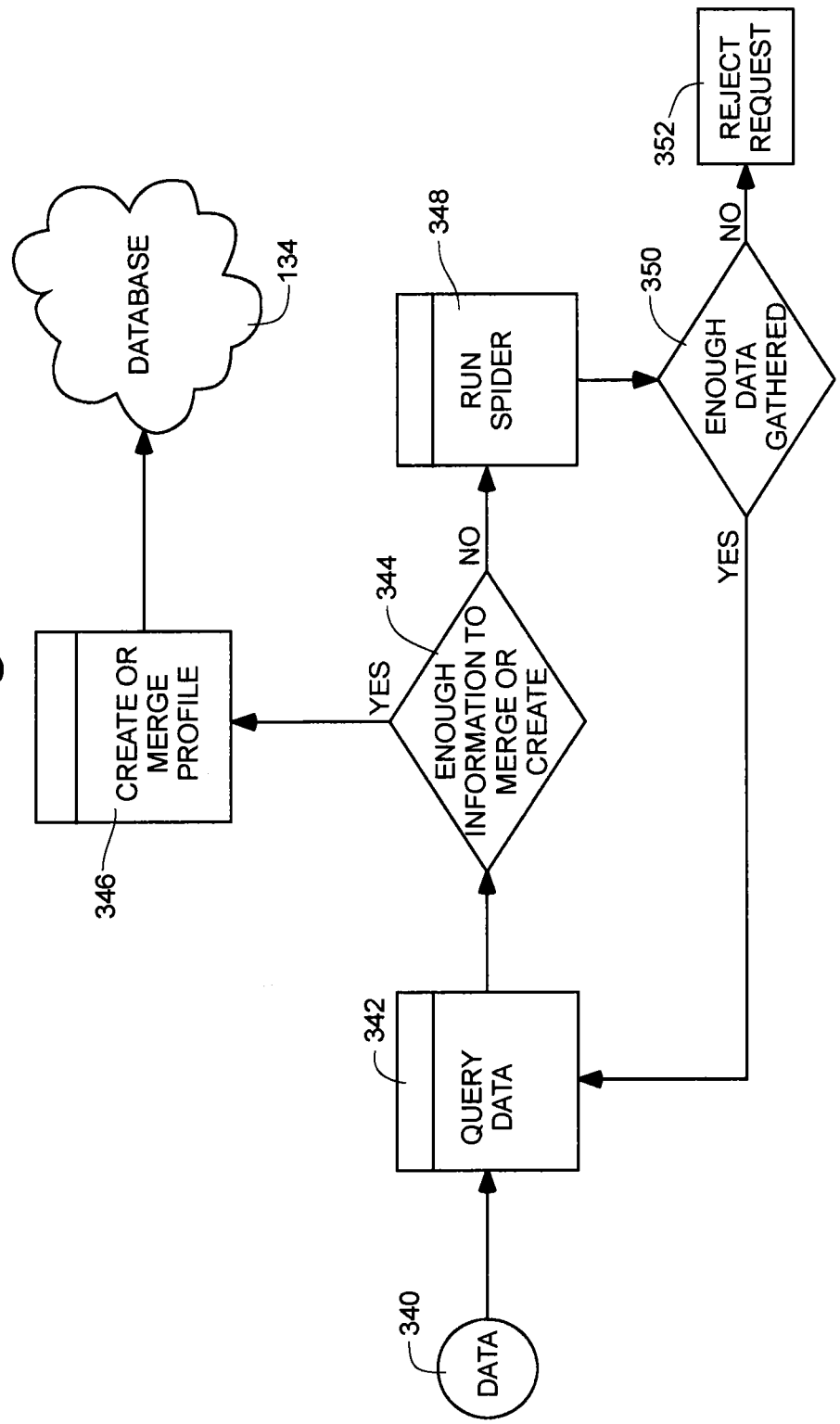
FIG. 3 is a flowchart of a process for managing spidering of the Internet to attain profile information, according to an embodiment of the present invention.

FIG. 3 depicts a flowchart illustrating one embodiment of a process of spidering and gathering personal information for user profiles 103, as implemented by spidering manager 128 via spidering servers 136 connected to the Internet. It will be understood that the methods and processes of the present invention, including those depicted in FIGS. 3-6, and 18-19, may be stored upon a computer-readable medium in the form of an instruction set to be executed by a computer or processor, wherein the computer or processor may be especially adapted to execute such instructions.

Referring to FIG. 3, initial personal data 340 has been initially acquired. Data 340 may include a name, or a name and other information such as a location, phone number, e-mail, and so on. The source of this initial data 340 may be a user inputting a name into DPIAS 100 for the purpose of finding additional information, may be data already existing in database 134, or in some other database, or may be from some other source otherwise linked to DPIAS 100.

At step 342, data 340 is queried via DPIAS 100. At step 344, DPIAS 100 determines whether enough information to merge data 340 into database 134 exists or creates a new profile 103 for entry into database 134.

If enough information exists, at step 346, data 340 is incorporated into database 134 at step 346. If data 340 is additional information to add to an existing profile 103 or bucket 102, the information is added to database 134 at a location associated with a profile 103. If data 340 is not associated with an existing profile 103, data 340 may be added to a location associated with a new profile 103 in database 134. In one embodiment, enough information exists if a name and a unique identifier exists. The unique identifier must be unique enough such that it may safely be assumed to belong to one person. In one embodiment, the unique identifier may be a location. For example, in one embodiment, enough information exists if a first name, last name, and a location are available. The location may be a complete street address, including city, state and country, or may be simply a city, state, and country. Further, the location may be linked to a home, work, or other address associated with the person of the profile 103. In another embodiment, the unique item of information may be an e-mail address. In the depicted embodiment, sufficient information exists for creating a new profile when a first name, last name, and a location are available. For merging data into an existing profile, as discussed further below with respect to FIGS. 4-6, enough data may exist when any number of unique identifiers exist, including a unique identifier of an e-mail address.

If data 340 is insufficient to create a profile 103 or merge data 340 into an existing profile 103 of database 134, data supplemental to data 340 is gathered at step 348. As described above with respect to FIGS. 1 and 2, data 340 and supplemental data is gathered via spider manager 128 in conjunction with distributed spidering servers 136 spidering available sources of data connected to the Internet, including identifying websites based on data 340, initiating scripts, associating, and validating data 340.

After supplemental data is gathered at step 348, at step 350, the supplemental data is reviewed to determine if enough data is gathered. If not, the request to add or merge data 340 is rejected at step 352, and the process ends. The criteria for determining whether enough data is gathered varies from embodiment to embodiment, with stricter criteria generally resulting in more accurate profiles 103 of database 134. For example, if no supplemental data is gathered, the process ends; if redundant data is gathered, the process ends; if significant data, such as an e-mail address, phone number, location, or other information is gathered, the data is queried again at step 342, and the process starts anew until data 340 becomes part of database 134, or the process ends. In one embodiment, at a minimum, data 340 must include a name plus one other significant data item, which may be a location. Further, in some embodiments, steps 344 and 350 may be essentially the same.

Figure 4:
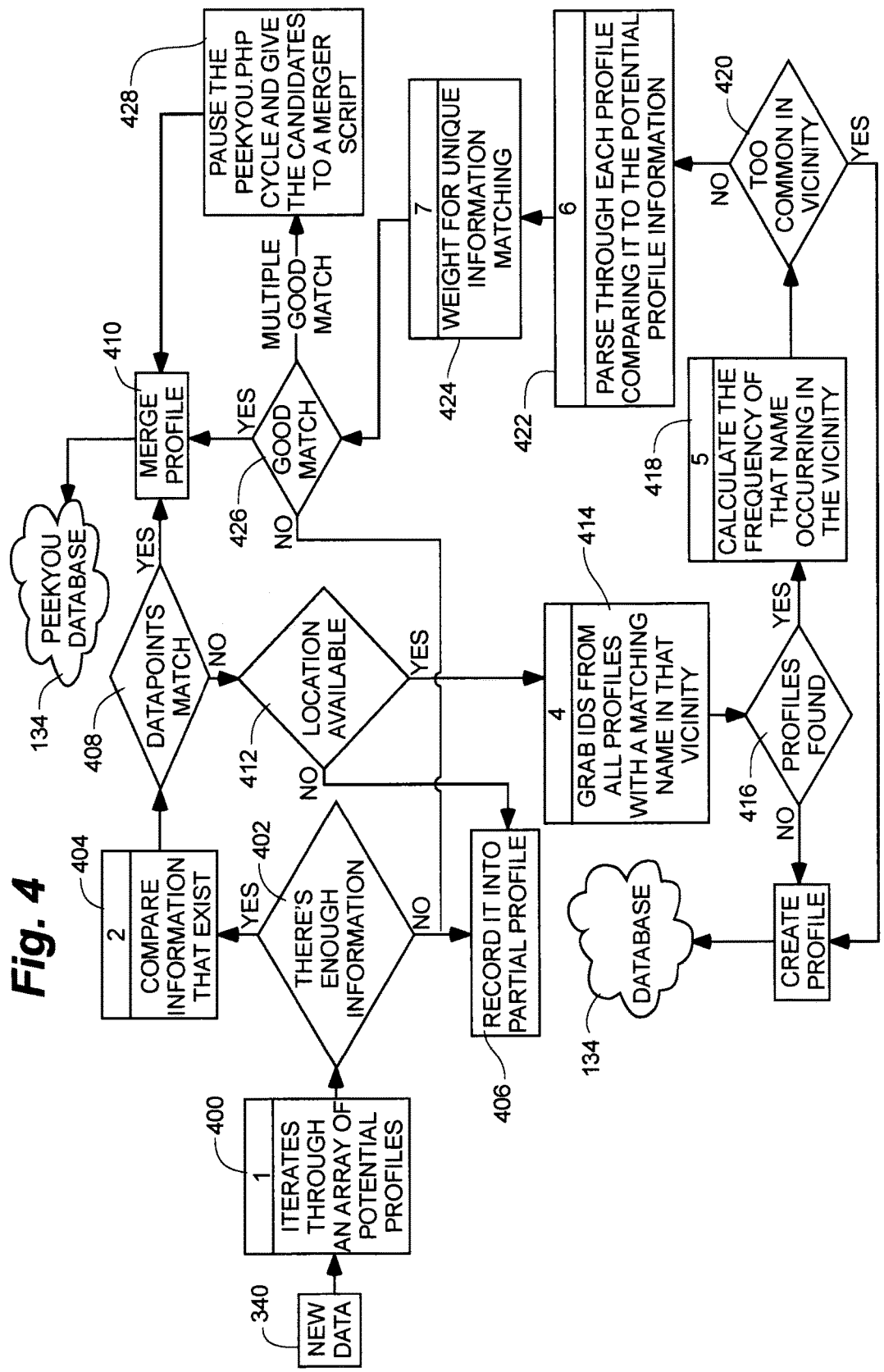
FIG. 4 is a flowchart of a process for managing and merging profile data, according to an embodiment of the present invention.

A more detailed description of a data matching and merging process is depicted via the flow chart of FIG. 4.

Referring to FIG. 4, data 340 is obtained by DPIAS 100. At step 400, database 134 and its profiles 103 are queried, in some cases via an iterative comparing data 340 to an array of potential profiles 103. At step 402, if enough information exists, data 340 is compared to one or more potential profiles 103 at step 404. If enough information does not exist, data 340 may be stored or recorded into a field of a partial profile 103a at step 406 for later reference and/or use. As previously described, in one embodiment, whether enough information exists at step 402 may include the criteria of having a name, and another significant item of information, such as location, e-mail, phone number, and so on.

At step 408, after comparing data 340 with profiles 103 of database 134, if the datapoints of data 340 match data of profile 103, data 340 is merged into a matching profile 103. The datapoint matching process is described in further detail below with respect to FIGS. 5 and 6.

In one illustrative example, if data 340 comprises the datapoints of a name, location, and an e-mail address, at step 402, enough information would exist such that data 340 may be compared to multiple profiles 103 in database 134 at step 404. At step 404, a data match is found when the name and location included in data 340 matches the name and location of an existing profile 103. At step 410, the e-mail address information would be merged into the profile 103.

On the other hand, if, after comparing data 340 to profiles 103 at steps 404 and 408, the datapoints of data 340 do not sufficiently match profile 103, a locational analysis is conducted.

More specifically, if data 340 cannot initially be matched to a profile 103 at step 408, data 340 is queried at step 412 to determine if data 340 includes a user location. If no location is available, data 340 is stored into a partial profile 103a at step 406.

If a location is available according to step 412, then at step 414, database 134 is queried to match a name associated with data 340 with one or more profiles 103, and whether profile 103 location is within a vicinity of data 340 location. For example, data 340 first and last names may match profile 103 first and last names, but data 340 location may a great distance from profile 103 location. In another example, the names may match, and the locations may be within several miles of each other, such as would be the case of a major city and its suburbs. In one embodiment, the criteria for determining an acceptable vicinity, or separating distance may be defined in one embodiment as a threshold distance separating data 340 location from profile 103 location. In another embodiment, the criteria may include whether the two locations co-exist within a common city, county, region, or other geographically defined boundary. Further, the criteria may be modified to accommodate density populations. For example, a shorter separating distance may be used for densely populated metropolitan areas.

At step 416, if no data 340 names match profile 103 names with the defined vicinity, then a new profile 103 is created at step 418, and the new profile 103 added to database 134.

At step 416, if one or more profiles 103 are within the vicinity of data 340, step 418 calculates the frequency of the name occurring in the previously defined vicinity. In one embodiment, the frequency of the name occurring in a particular vicinity is determined by reference to census data for the vicinity.

If the frequency of names occurring in the vicinity is too high, or the name is considered too common, at step 420, a new profile 103 for data 340 is created for insertion into database 134. If the frequency is low, or the name is not too common, further comparisons of data 340 to profiles 103 are conducted. The threshold criteria for frequency may be varied depending upon desired database accuracy, and/or for other factors.

In one embodiment, frequency is determined based on census and population data, and is determined as an estimated number of people with a given name, located within a given radius of any location. For example, using census and population data, DPIAS 100 estimates that 127.4 John Does live within 30 miles of Princeton, N.J. In this example, additional data would be desirable to ensure an accurate match to an existing profile. In another example, DPIAS 100 may estimate that there are 0.02 John Qwertys living within 30 miles of Princeton, N.J. In this case, a match is very likely, and the uniqueness of additional information less critical.

If data 340 name is not too common, at steps 422 and 424, profiles 103 within the vicinity of data 340, or potential profiles 103, are parsed and compared to data 340. Various datapoints or parsed information from profile 103 may be weighted to determine at step 426 whether data 340 sufficiently matches a potential profile 103, such that the additional information of data 340 should be merged into potential profile 103. Further details regarding how step 426 and step 408 determine whether data 340 sufficiently matches profile 103 are discussed below with respect to FIGS. 5 and 6.

Still referring to FIG. 4, if a good match is determined at 426, data 340 is merged into the appropriate profile 103 of database 134 at step 410. If multiple good matches are determined at step 426, potential profiles 103 are merged at step 428, followed by a merger of data 340 with the previously merged profiles 103.

Figure 5:
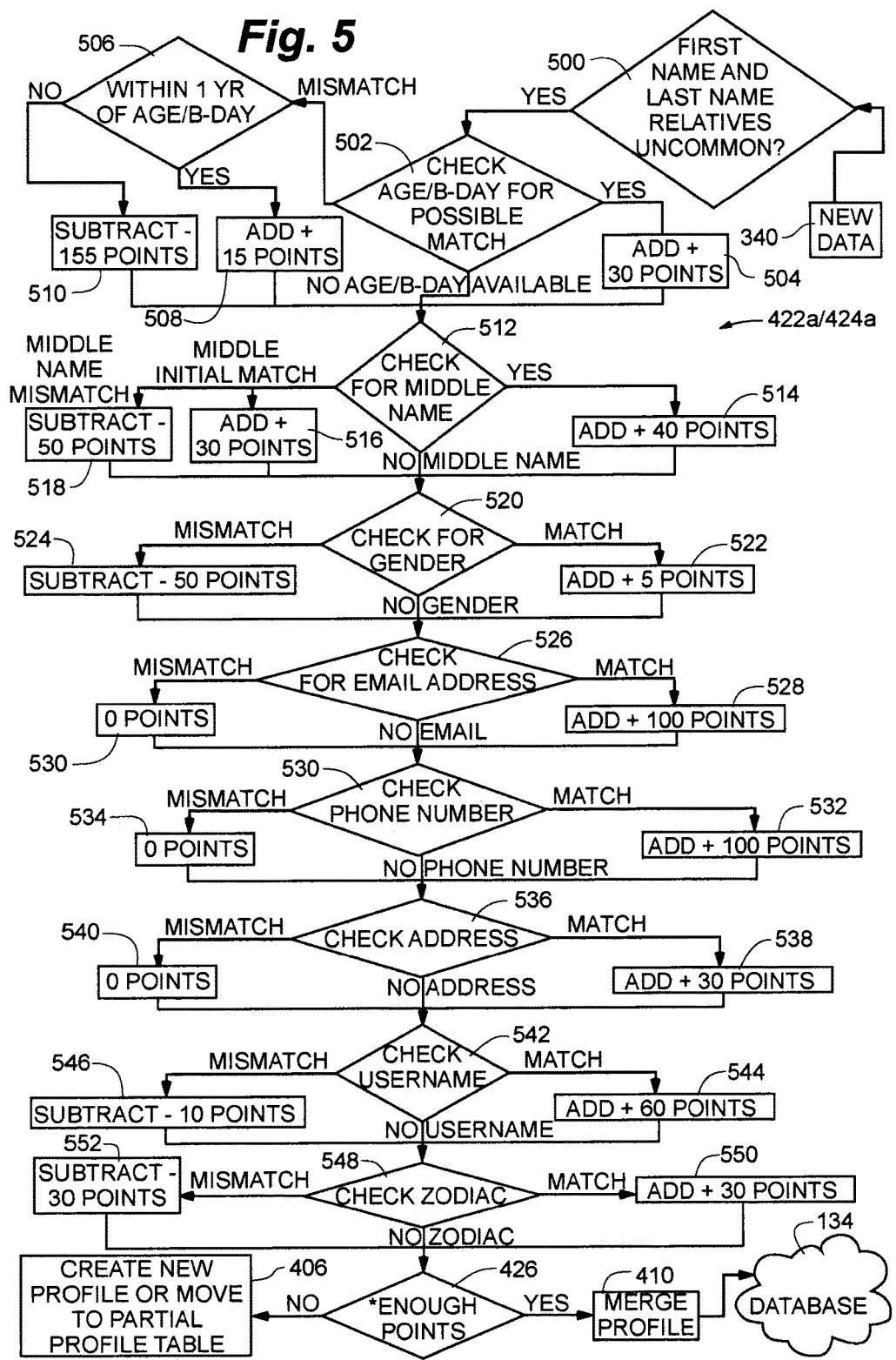
FIG. 5 is a flowchart of a process for merging data associated with a relatively uncommon name combination, according to an embodiment of the present invention.
Figure 6:
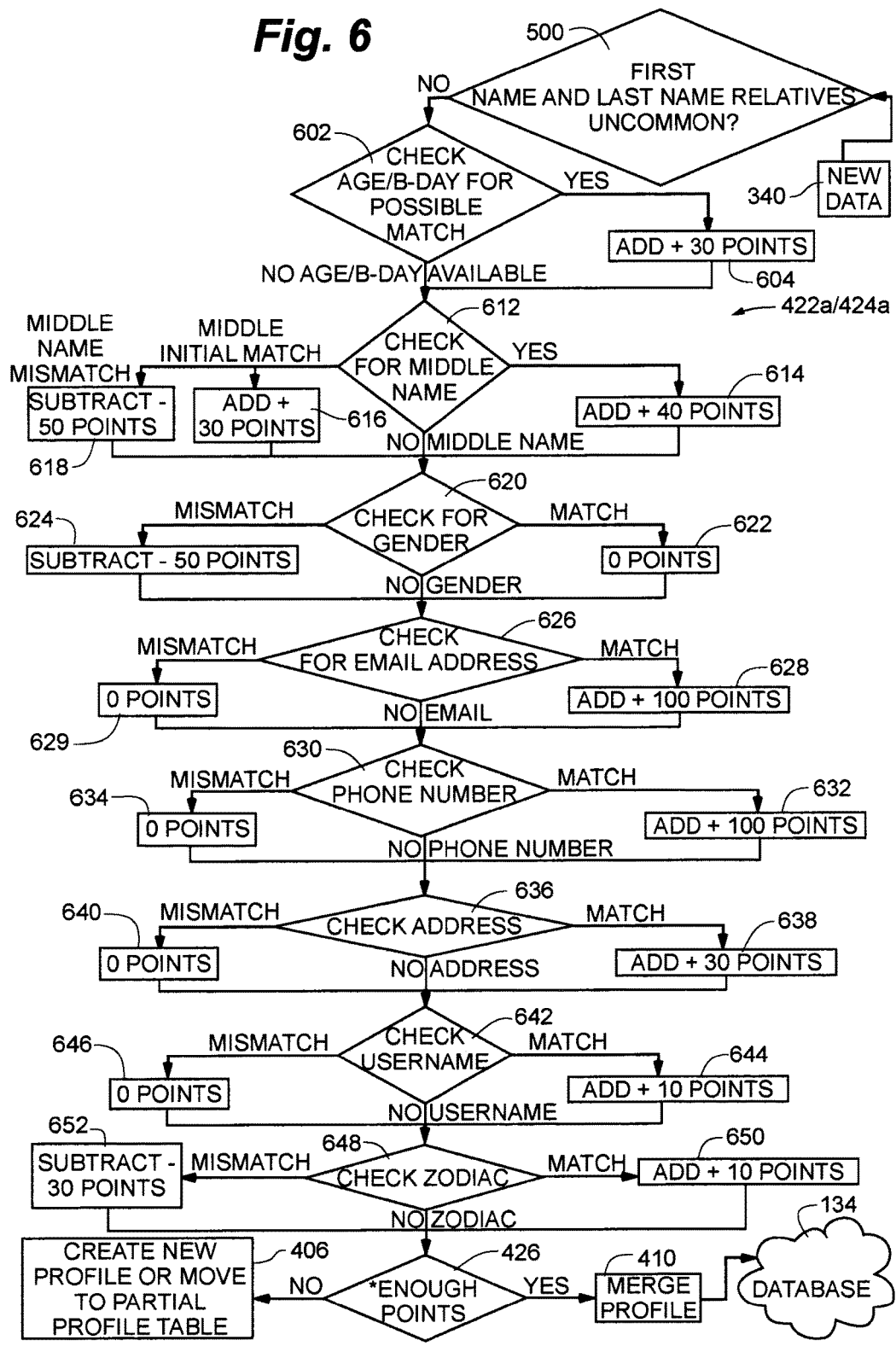
FIG. 6 is a flowchart of a process for merging data associated with a relatively common name combination, according to an embodiment of the present invention.

Referring now to FIGS. 5 and 6, a pair of flowcharts depict an embodiment of the processes of steps 422 and 424, namely parsing through profiles 103 in database 134 and comparing profile 103 data to data 340 (step 422) and weighting each profile 103 as a potential match for data 340 (step 424). FIG. 5 depicts the case where data 340 comprises a combination of a first name and a last name that is relatively uncommon. FIG. 6 depicts the case where the name combination of data 340 is not relatively uncommon.

In one embodiment, at step 500, determining whether a name combination of data 340 is relatively common may comprise determining whether the name combination appears in the population of a large region, perhaps a country, more or less than a threshold number of times. This threshold number may be based on census data for a geographic region such as a country. For example, at a given time, the United States may be expected to have 12,000 people with the first name John and the last name Doe. If the threshold number is 10,000, this name is not relatively uncommon, or is relatively common, and the process of FIG. 6 would be implemented. If the threshold number is 15,000, the name combination John Doe would be relatively uncommon, and the process of FIG. 5 would be implemented.

In one embodiment, a reference table or database may be populated with a list of relatively common names, and each data 340 name combination would be compared to the list of relatively common names, and if a data 340 name combination appears on the list, the data 340 name combination would be relatively common, and hence the process of FIG. 6 applies. Otherwise, the process of FIG. 5 applies.

Referring specifically to FIG. 5, at step 500, and as described above, a first name and last name of data 340 are evaluated to determine whether the name combination is relatively uncommon. For the purposes of FIG. 5, the name combination of data 340 is determined to be relatively uncommon, and a series of steps, step 502 to step 550 are undertaken to determine a relative data match quality for data 340 as compared to profiles 103 of database 134. If a sufficiently good match is found between data 340 and a matching profile 103, data 340 is merged with the matching profile 103 in database 134.

As described above, data 340 may include many different datapoints, or pieces of information related to a person's name. For example, data 340 may include datapoints on a person's age, birthday, middle name, gender, e-mail address, phone number, street address, username, zodiac, and so on. Some of these datapoints may provide a stronger indication as to whether data 340 should be matched to an existing profile 103 of database 134. For example, if data 340 includes a first and last name plus an e-mail address, and after a comparison with a profile 103, it is determined that the e-mail addresses of data 340 and profile 103 match, there is a high likelihood that the person associated with data 340 and the person associated with profile 103 are in fact the same person. On the other hand, having a zodiac match, though suggestive of a person match, might not suggest a match as strongly as a matching e-mail address.

Table 1 below lists a number of factors and their relative weights for an embodiment of the claimed invention. The factors of Table 1 may be applied to any comparison of data 340 and a profile 103.

In the depicted embodiment of Table 1, a number of data comparison factors are listed, along with their relative weights in the case of a factor match between a profile 103 and data 340, and for the case of a factor mismatch between profile 103 and data 340.

For example, a phone number is considered a relatively important match, having a "very high" relative weight in the case of a phone number match between a profile 103 and data 340. On the other hand, if a phone number match does not exist, the relative mismatch weight is not considered relevant, or "none." In the case of a phone number mismatch, it may be possible that a person has more than one phone number, e.g., work, home, mobile, or others, such that a mismatch does not strongly suggest that the person associated with data 340 is not the person associated with profile 103.

In another example, the factor "middle name" carries a high relative match weight and a high relative mismatch weight. In this case, a person generally will not be expected to have different middle names, so both a match and a mismatch carry high, and equal weights.

TABLE 1

| Factor | Relative Match Weight | Relative Mismatch Weight | Relative Match Weight (Points) | Relative Mismatch Weight (Points) |
| --- | --- | --- | --- | --- |
| Email | Very High | None | 100 | 0 |
| Phone Number | Very High | None | 100 | 0 |
| Age Match | Medium-High | | 30 | See +/− 1 yr |
| Age Match +/− 1 yr | Medium | Very High | 15 | −155 |
| Username | High | Medium-Low | 60 | −10 |
| Middle Name | High | High | 40 | 50 |
| Middle Initial | Medium-High | High | 30 | 50 |
| Zodiac | Medium-High | Medium-High | 30 | −30 |
| Address | Medium-High | None | 30 | 0 |
| Gender | Low | High | 5 | −50 |

Table 1 includes the factors: e-mail, having a very high relative match weight and no relative mismatch weight; phone number, having a very high match weight and no mismatch weight; age match, having a medium high match weight; age match +/− one year, having a medium match weight and a very high mismatch weight; username having a high match weight and a medium-low mismatch weight; middle name, having high match and mismatch weights; middle initial, having a medium-high match weight and a high mismatch weight; zodiac sign, having medium-high match and mismatch weights; address, having a medium-high match weight and no mismatch weight; and gender, having a low match weight and a high mismatch weight. It will be understood that more or fewer factors may be included to assess the relative weights of specific datapoints, or pieces of information, so that an overall weighting of whether a profile 103 is a good match with data 340.

In one embodiment, and as also listed in Table 1, relative match and mismatch weights may be applied using numeric indicators, such as points, to derive a numeric indication of the relative match strength between data 340 and a profile 103. In such an embodiment, a number of individual factors are applied to data 340 and profile 103, and a final point total derived. The point total may be compared to a threshold point total to determine whether data 340 and profile 103 match sufficiently well such that data 340 may be merged into profile 103 and database 134.

Table 1 provides match and mismatch weights in terms of point values for the factors described above, according to an embodiment of the claimed invention.

In one embodiment, Table 1 may be applied specifically to the case where at step 500 the first and last name combination of data 340 is determined to be relatively uncommon, as is the case of FIG. 5.

Referring to FIG. 5, a flowchart depicts a process for determining whether data 340 having a relatively uncommon first and last name combination sufficiently matches profile 103, such that the person of data 340 is likely to be the person of profile 103, and such that data 340 should be merged into database 134. The factors of Table 1, and associated point values, are applied to the comparison of profile 103 and data 340. A match value defined in terms of points is determined and compared to a predetermined threshold point value. If the final match value is above the predetermined threshold point value, data 340 will be merged into profile 103 of database 134. If not, a new profile 103 based on data 340 may be created, or data 340 may be stored in a partial profile table as described above. It will be understood that a higher predetermined threshold point value will increase the accuracy of database 134. In one embodiment, a predetermined threshold point value may be 30 points. In other embodiments, the threshold point value may be above or below 30 points, or may range from 20 to 40 points.

Still referring to FIG. 5, at step 500, the first and last name combination of data 340 are determined to be relatively uncommon, as described above.

At step 502, factors relating to age and birthday are applied to data 340 and profile 103. If the age or birthday of profile 103 matches the age of birthday of data 340, a weight of 30 points is assigned to a match value at step 504. If the age or birthday does not match, the process of DPIAS 100 determines whether the age or birthday of profile 103 is within one year of the age or birthday of data 340 at step 506. If within one year, 15 points are added to the match value at step 508, if not, 155 points are subtracted from the match value at step 510. If no age or birthday data is available for comparison, the age or birthday factor is ignored, and a middle name factor is considered at step 512.

At step 512, a middle name for profile 103 is compared to a middle name for data 340. If no middle name or middle initial is available, the next factor is checked. If middle names match, 100 points is added to the match value at step 514. If middle names do not match, 50 points are subtracted from the match value at step 518. In an embodiment, if only a middle initial is available, and it matches, then 30 points are added at step 518 to the match total.

At step 520, a gender for profile 103 is compared to a gender for data 340. If no gender is available, the next factor is checked. If gender matches, 5 points are added to the match value at step 522; if gender is a mismatch, 50 points are subtracted from the match value at step 524.

At step 526, an e-mail address for profile 103 is compared to an e-mail address for data 340. If e-mail addresses are not available, the next factor is checked. If e-mail addresses match, 100 points are added to the match value at step 528; if e-mail addresses are a mismatch, no points are subtracted from the match value, as depicted at step 529.

At step 530, a phone number for profile 103 is compared to a phone number for data 340. If e-mail addresses are not available, the next factor is checked. If phone numbers match, 100 points are added to the match value at step 532; if phone numbers are a mismatch, no points are subtracted from the match value, as depicted at step 534.

At step 536, a street address for profile 103 is compared to a street address for data 340. If street addresses are not available, the next factor is checked. If street addresses match, 30 points are added to the match value at step 538; if street addresses are a mismatch, no points are subtracted from the match value, as depicted at step 540.

At step 542, a username for profile 103 is compared to a street address for data 340. If usernames are not available, the next factor is checked. If usernames match, 60 points are added to the match value at step 544; if usernames are a mismatch, 10 points are subtracted from the match value at step 546.

At step 548, a zodiac for profile 103 is compared to a zodiac symbol for data 340. If zodiacs are not available, the next factor is checked. If zodiacs match, 30 points are added to the match value at step 550; if zodiacs are a mismatch, 30 points are subtracted from the match value at step 552.

Finally, after checking all or some of the factors, the total match value is compared to the predetermined threshold point value to determine whether the match value exceeds the predetermined threshold point value at step 426. If the total match value exceeds the predetermined threshold point value, data 340 is merged into profile 103 and database 134. If not, at step 406, data 340 may be compared to a next profile 103, stored into a partial profile table, or a new profile 103 based on data 340 may be created.

More specifically, if a particular profile 103 does not sufficiently match data 340, additional profiles 103 may be compared. If multiple profiles 103 are compared, and more than one profile 103 exceeds the threshold point value, the profile 103 having the highest point match value will be the profile 103 that data 340 is merged into.

Further, in one embodiment, if the match value does not exceed the predetermined threshold value, and all relevant profiles 103 have been checked, e.g., those with the same name, and a name and a location are available information of data 340, a new profile 103 may be created in database 134.

In one embodiment, where a first and last name combination of data 340 are determined to not be relatively uncommon, i.e., are relatively common, the relative weight factors of Table 2 may be applied via the process depicted in FIG. 6. It will be understood that Table 1 and FIG. 5 may be applied in the case of a name combination of data 340 being relatively common, but the use of a Table 2, which is a modified version of Table 1, and process of FIG. 6, may improve the accuracy of the comparison by weighting factors in a way that considers the common nature of the name combination.

TABLE 2

| Factor | Relative Match Weight | Relative Mismatch Weight | Relative Match Weight (Points) | Relative Mismatch Weight (Points) |
| --- | --- | --- | --- | --- |
| Email | Very High | None | 100 | 0 |
| Phone Number | Very High | None | 100 | 0 |
| Age Match | Medium-High | None | 30 | 0 |
| Middle Name | Medium-High | High | 30 | −50 |
| Middle Initial | Medium-Low | High | 10 | −50 |
| Address | Medium-High | None | 30 | 0 |
| Username | Medium-Low | None | 10 | 0 |
| Zodiac | Medium-Low | Medium-High | 10 | −30 |
| Gender | None | High | 0 | −50 |

Table 2 includes the factors: e-mail, having a very high relative match weight and no relative mismatch weight; phone number, having a very high match weight and no mismatch weight; age, having a medium high match weight and no mismatch weight; middle name, having medium-high match weight and a high mismatch weight; middle initial, having a medium-low match weight and a high mismatch weight; address, having a medium-high match weight and no mismatch weight; username, having a medium-low match weight and no mismatch weight; zodiac sign, having medium-low match weight and medium-high mismatch weights; and gender, having no match weight and a high mismatch weight.

In the embodiment of Table 2, the weighting of certain Table 2 factors takes into consideration that data comparisons of relatively common names may benefit from weighting factors relating more closely to names, e.g., middle name, more strongly. Similar to Table 1, it will also be understood that more or fewer factors may be included to assess the relative weights of specific datapoints, or pieces of information, so that an overall weighting of whether a profile 103 is a good match with data 340.

Referring now to FIG. 6, a flowchart depicts a process for determining whether data 340 having a relatively common first and last name combination sufficiently matches profile 103, such that the person of data 340 is likely to be the person of profile 103, and such that data 340 should be merged into database 134. The factors of Table 2, and associated point values, are applied to the comparison of profile 103 and data 340. A match value defined in terms of points is determined and compared to a predetermined threshold point value. If the final match value is above the predetermined threshold point value, data 340 will be merged into profile 103 of database 134. If not, a new profile 103 based on data 340 may be created, or data 340 may be stored in a partial profile table as described above. It will be understood that a higher predetermined threshold point value will increase the accuracy of database 134. In one embodiment, a predetermined threshold point value may be 30 points. In other embodiments, the threshold point value may be above or below 30 points, or may range from 20 to 40 points.

Still referring to FIG. 6, at step 500, the first and last name combination of data 340 are determined to be relatively uncommon, as described above.

At step 602, factors relating to age and birthday are applied to data 340 and profile 103. If the age or birthday of profile 103 matches the age of birthday of data 340, a weight of 30 points is assigned to a match value at step 604. If no age or birthday data is available for comparison, the age or birthday factor is ignored, and a middle name factor is considered at step 612.

At step 612, a middle name for profile 103 is compared to a middle name for data 340. If no middle name or middle initial is available, the next factor is checked. If middle names match, 30 points are added to the match value at step 614. If middle names don't match, 50 points are subtracted from the match value at step 618. In one embodiment, if only a middle initial is available, and it matches, then 10 points are added at step 618 to the match value total.

At step 620, a gender for profile 103 is compared to a gender for data 340. If no gender is available, the next factor is checked. If gender matches, 0 points are added to the match value at step 622; if gender is a mismatch, 50 points are subtracted from the match value at step 624.

At step 626, an e-mail address for profile 103 is compared to an e-mail address for data 340. If e-mail addresses are not available, the next factor is checked. If e-mail addresses match, 100 points are added to the match value at step 628; if e-mail addresses are a mismatch, no points are subtracted from the match value, as depicted at step 629.

At step 630, a phone number for profile 103 is compared to a phone number for data 340. If e-mail addresses are not available, the next factor is checked. If phone numbers match, 100 points are added to the match value at step 632; if phone numbers are a mismatch, no points are subtracted from the match value, as depicted at step 634.

At step 636, a street address for profile 103 is compared to a street address for data 340. If street addresses are not available, the next factor is checked. If street addresses match, 30 points are added to the match value at step 638; if street addresses are a mismatch, no points are subtracted from the match value, as depicted at step 640.

At step 642, a username for profile 103 is compared to a street address for data 340. If usernames are not available, the next factor is checked. If usernames match, 10 points are added to the match value at step 644; if usernames are a mismatch, 0 points are subtracted from the match value as depicted at step 646.

At step 648, a zodiac for profile 103 is compared to a zodiac symbol for data 340. If zodiacs are not available, the next factor is checked. If zodiacs match, 10 points are added to the match value at step 650; if zodiacs are a mismatch, 30 points are subtracted from the match value at step 652.

Finally, after checking all or some of the factors, the total match value is compared to the predetermined threshold point value to determine whether the match value exceeds the predetermined threshold point value at step 426. If the total match value exceeds the predetermined threshold point value, data 340 is merged into profile 103 and database 134. If not, at step 406, data 340 may be compared to a next profile 103, stored into a partial profile table, or a new profile 103 based on data 340 may be created.

More specifically, if a particular profile 103 does not sufficiently match data 340, additional profiles 103 may be compared. If multiple profiles 103 are compared, and more than one profile 103 exceeds the threshold point value, the profile 103 having the highest point match value will be the profile 103 that data 340 is merged into.

Further, in one embodiment, if the match value does not exceed the predetermined threshold value, and all relevant profiles 103 have been checked, e.g., those with the same name, and a name and a location are available information of data 340, a new profile 103 may be created in database 134.

After initially populating database 134 with multiple profiles 103, new data 340 may continually be merged and added to database 134 through the addition of new profiles 103, or by merging data 340 into existing profiles 103. In one embodiment, spider manager 128 performs algorithms and processes, such as those described in FIGS. 3-6, via spider servers 136, web servers 126, memcache servers 132, and other hardware device, to continually add new data 340 and new profiles 103 to database 134. Such algorithms and processes may be stored in memory devices located on spider servers 136, or other servers of DPAI 100, and executed by processors comprising DPIAS 100. Spider manager 128 may initiate such algorithms and process as part of a routine profile 103 gathering process, simply for the sake of growing the number of profiles 103, depth of profiles 103, or accuracy of profiles 103. In other, not necessarily exclusive, embodiments, a user may manually enter information into database 134, or may utilize DPIAS 100 to search database 134, and at the same time gather data 340 using the DPIAS.

Consequently, additional embodiments of the claimed invention include a number of additional systems, apparatuses, methods of using and growing database 134, as well as user-interfaces for searching and viewing content of database 134.

Figure 7:
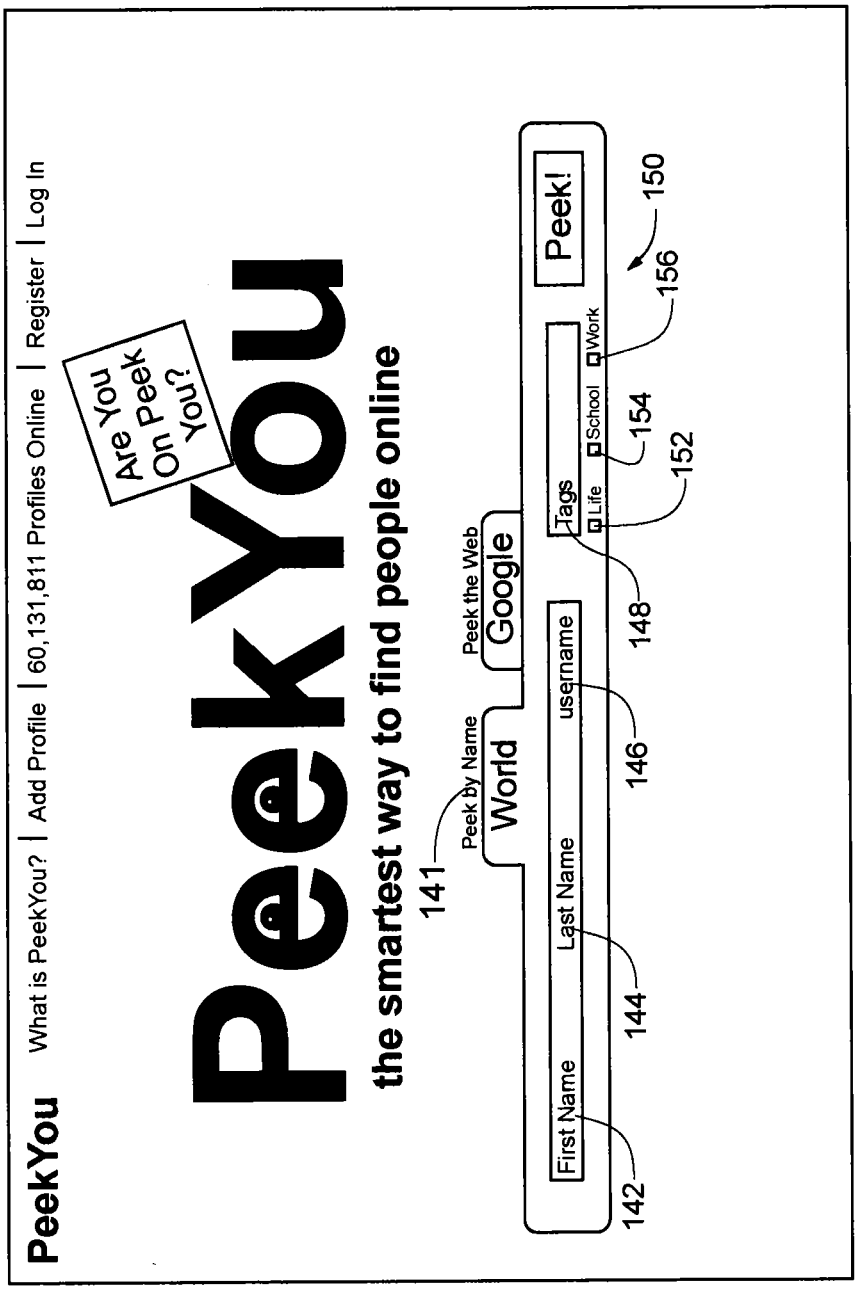
FIG. 7 is a graphical representation of a client-side interface according to an embodiment of the present invention.

Referring to FIG. 7, according to one embodiment of the present invention a client-side interface to the DPIAS 100 may be embedded in a webpage 140 to enable end-user searching and retrieval of information related to persons on the web. User-selectable tabs may be included in the client-side interface to broaden application functionality and increase application usability. In this manner an end-user may quickly select a tab enabling search focusing functionality. After selecting the appropriate tab, the end-user will be allowed to enter relevant search information.

In one embodiment of the present invention, an end-user may wish to search the DPIAS 100 based on name and thus would select the name tab 141. An end-user may enter in a first name 142, last name 144, a username 146 or any additional tags 148 potentially or actually associated with a specific user in the DPIAS 100 in the relevant search fields on the client-side application. In addition, in one embodiment of the present invention, pre-determined tags 150 are selectable as search terms. These include, but are not limited, to information tagged as relating to life 152, school 154 or work 156. These tags may be metadata or may be contained in information retrieved by the DPIAS 100 or it may be information intelligently tagged by the DPIAS 100.

Figure 7A:
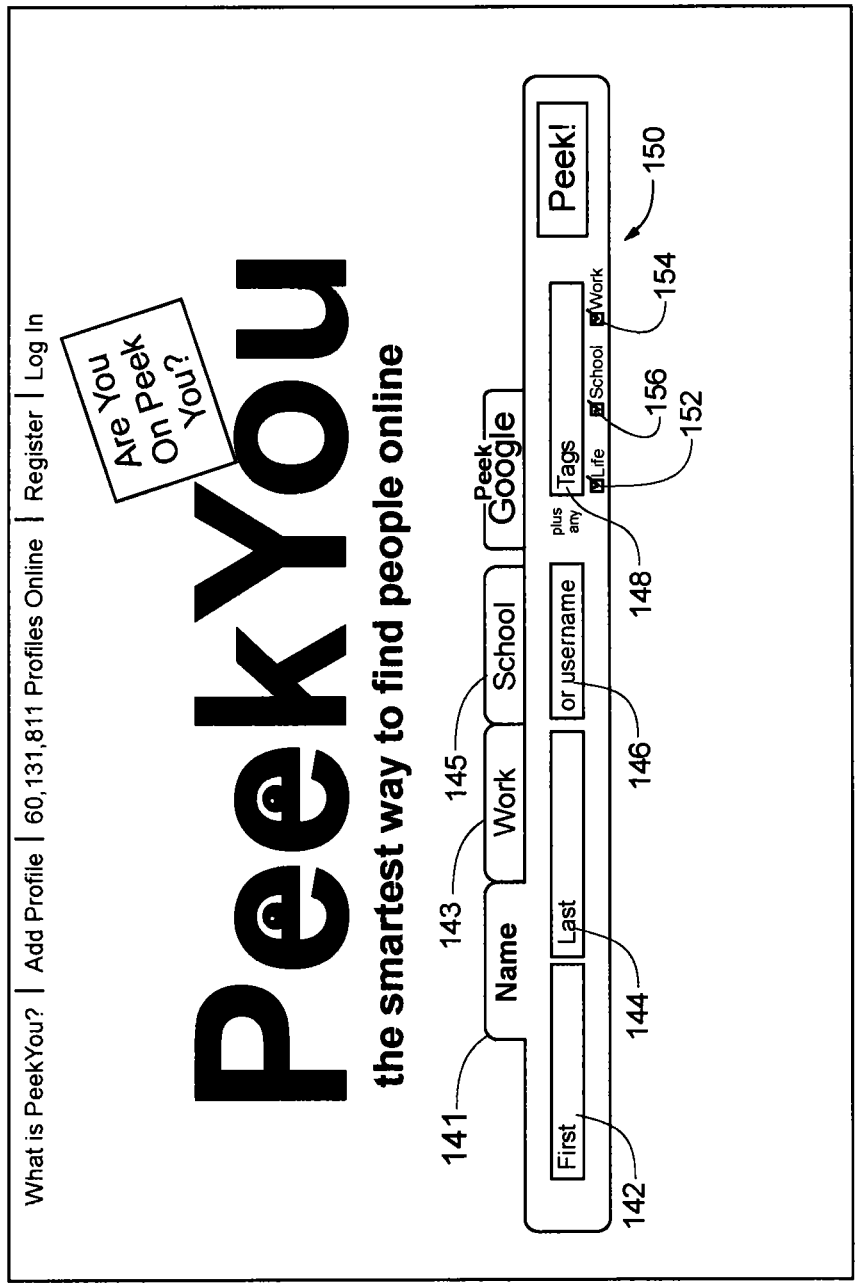
FIG. 7a is a graphical representation of a client-side interface, according to another embodiment of the present invention.
Figure 7B:
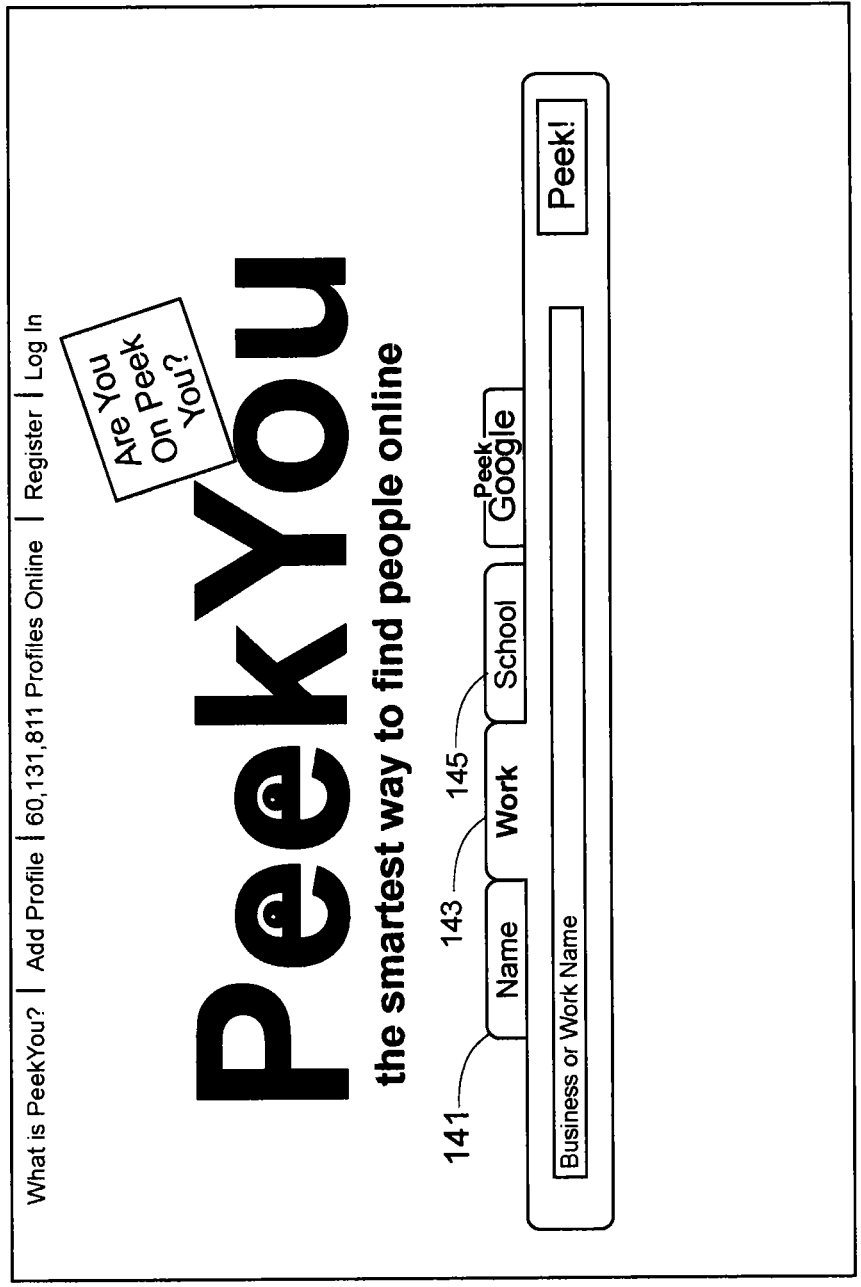
FIG. 7b is a graphical representation of a client-side interface, according to another embodiment of the present invention.
Figure 7C:
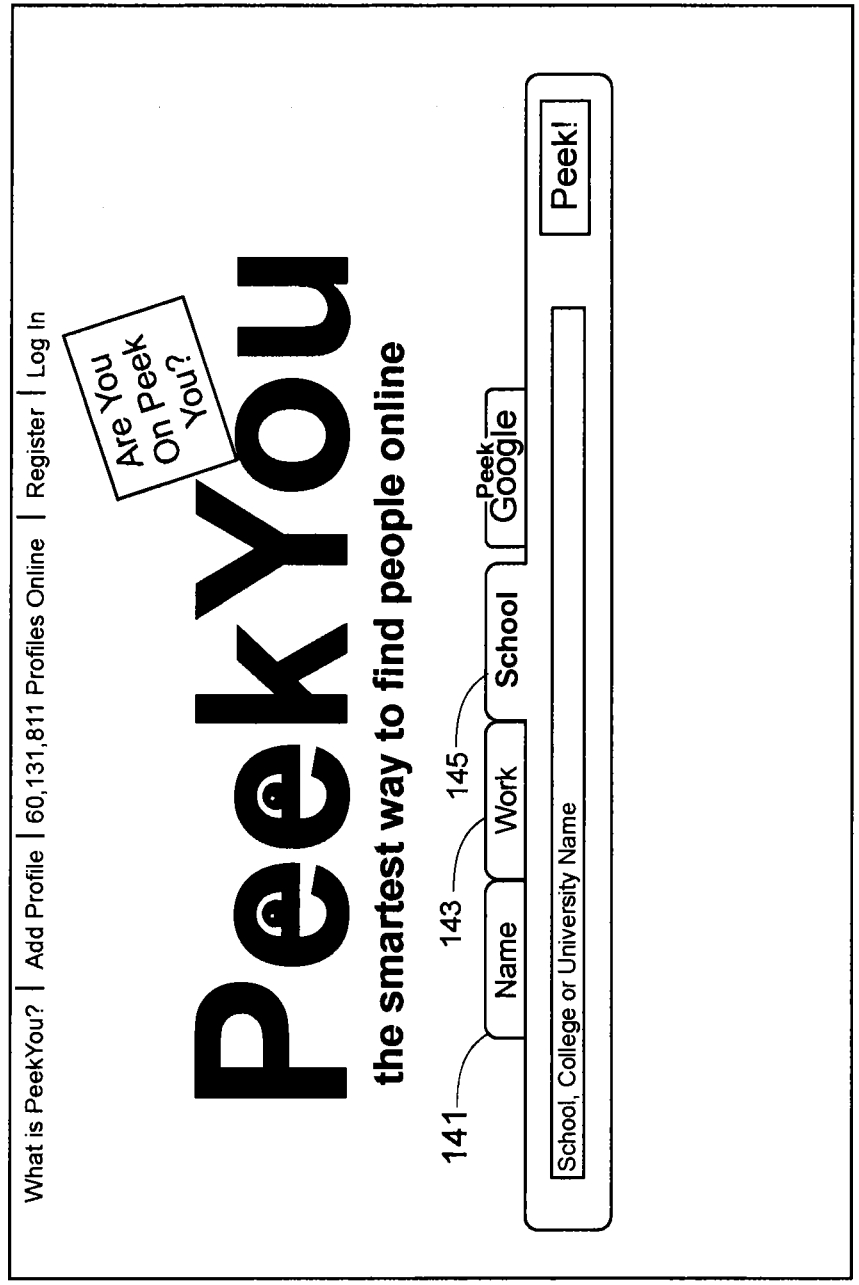
FIG. 7c is a graphical representation of a client-side interface, according to another embodiment of the present invention.

Additional search functionality is enabled by adding additional tabs to the client side interface 140 as exemplified in FIGS. 7a, 7b and 7c. Various embodiments of the current invention may allow the end-user to search by name 141, work 143, and school 145. One having skill in the art will appreciate that additional search functionality may be enabled by adding additional tabs to the client-side interface.

Figure 8:
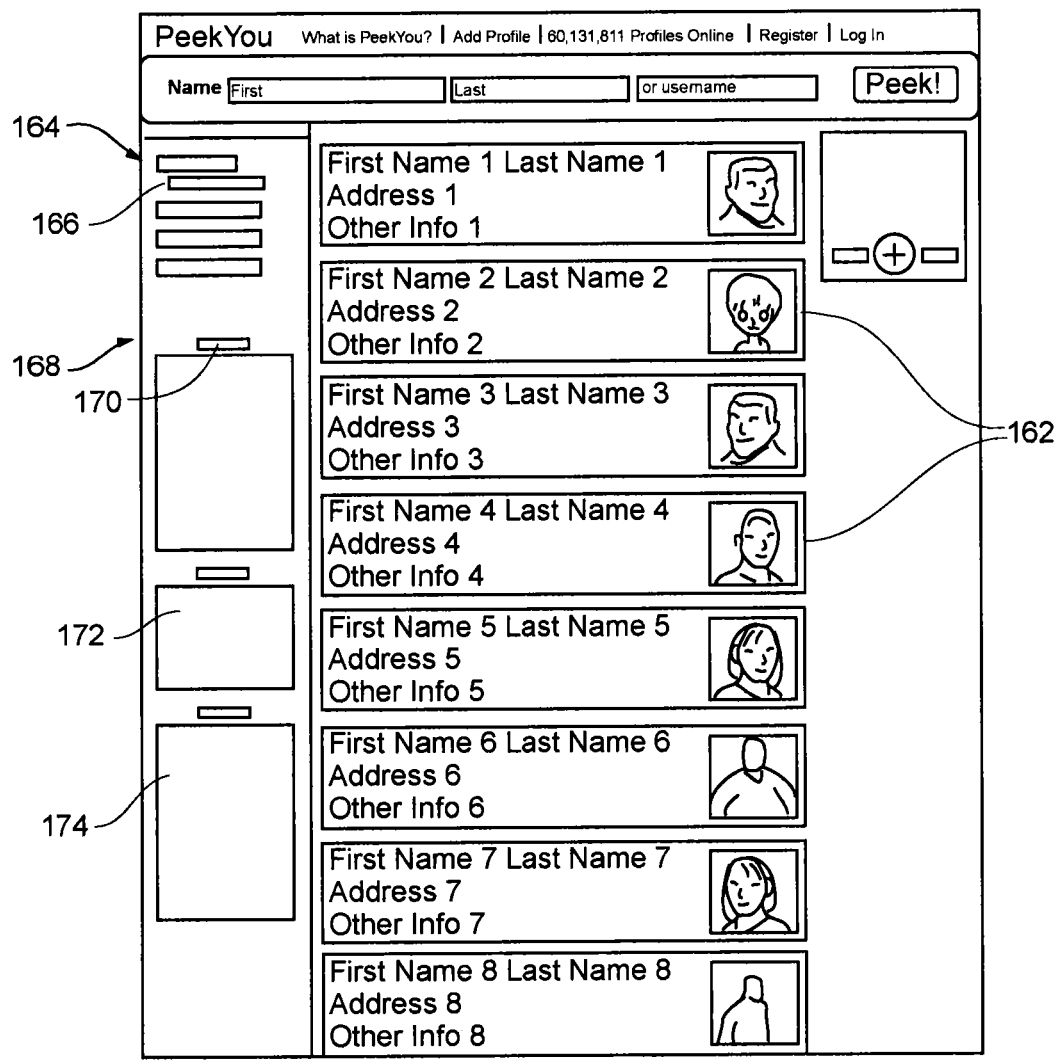
FIG. 8 is a graphical representation of person search results, according to another embodiment of the present invention.

Referring to FIG. 8, in one embodiment of the present invention the client-side interface will return a results list 160 displaying brief summaries 162 of relevant persons contained within the DPIAS 100. The client-side application may include a search-narrowing application pane 164 that allows for further refinement of search terms in an effort to focus the search terms. In one embodiment of the present invention the narrowing application pane 164 includes the ability to refine search results by location 166, and one or more tags 168. The tags 168 may include tags relating to life 170, school 172 or work 174. In another embodiment of the present invention the search results may be further refined by an age slider bar that may narrow results based on age range. The search narrowing pane 162 may include the ability to refine search results based on any combination of: name, location, school, work, interests, age, sex, and online aliases. One having skill in the art will recognize that the search narrowing pane may alter its result refining capability depending on the data returned by the end-user initiated search.

Figure 9:
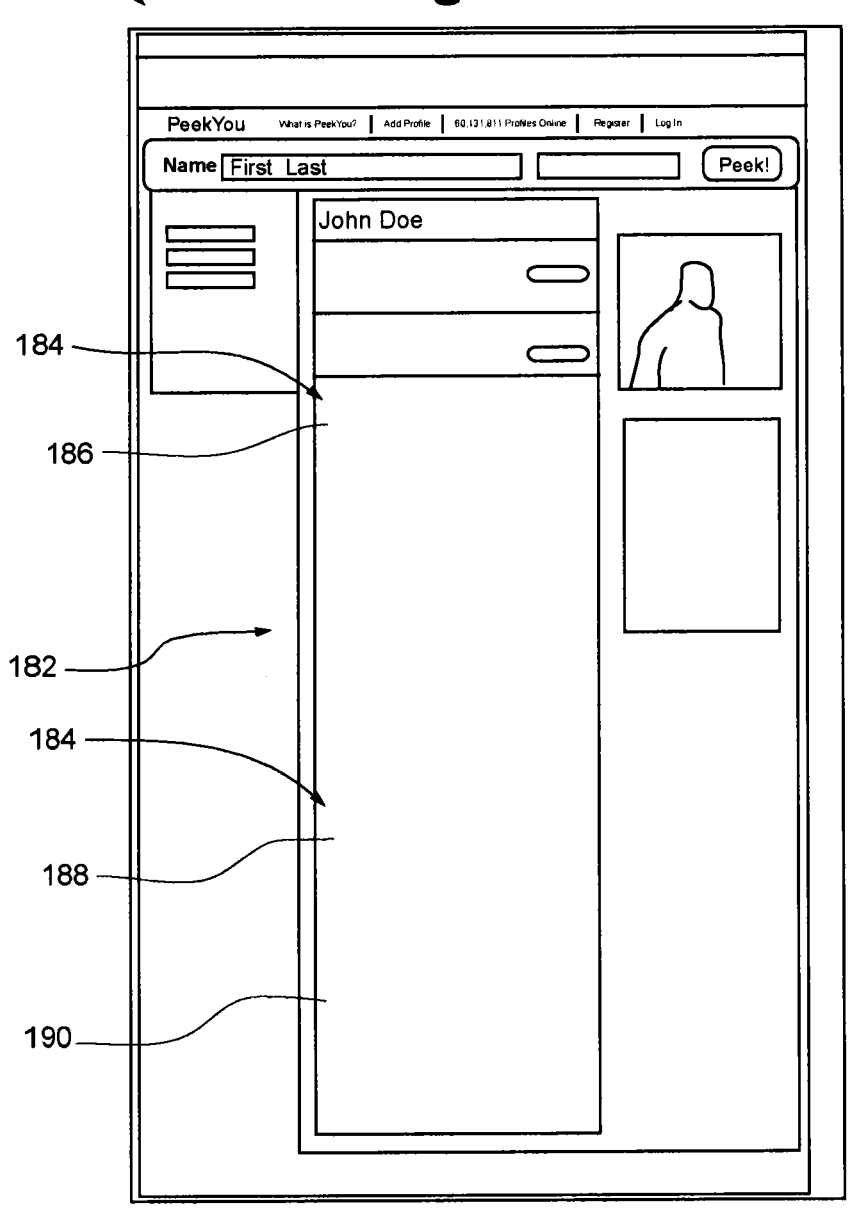
FIG. 9 is a graphical representation of the personal profile generated by the distributed information ownership aggregation system, according to an embodiment of the present invention.

Referring to FIG. 9, in one embodiment of the present invention, selecting a user profile from the search result list 160 will result in the display of a personal profile page 180. The personal profile page 180 is a representation of the user buckets 102 contained within the DPIAS 100.

In one embodiment of the present invention the personal profile page 180 displays all the aggregated information 182 that is matched or associated with that user and available on the Internet. The aggregated information may be displayed in groupings 184 to facilitate viewability. In one embodiment of the present invention aggregated information 182 is displayed grouped by personal and social links 186, photo and video links 188 and business and press links 190. In another embodiment of the present invention digital image files associated with a user in the DPIAS 100 may be viewable on the personal profile page 180 in image format. One having skill in the art will appreciate that the aggregated information 182 can be displayed in any groupings that will facilitate end-user ease-of-use and clarity.

In another embodiment of the present invention, end-users can log into the client-side system and edit their personal profile page 180. In this manner, end-users can utilize the client-side interface to add links into their user bucket, edit existing descriptions of personal profile information, report inaccuracies in the personal profile information, and submit data tags that further define and/or categorize information of the person in the profile. In another embodiment of the present invention, any user profile may be altered by an end-user through the client-side interface. Thus, information retrieved by the DPIAS 100 and displayed in the personal profile 180 may be communally supported and refined in order to provide the most complete, relevant and up-to-date information on Internet users.

Figure 10:
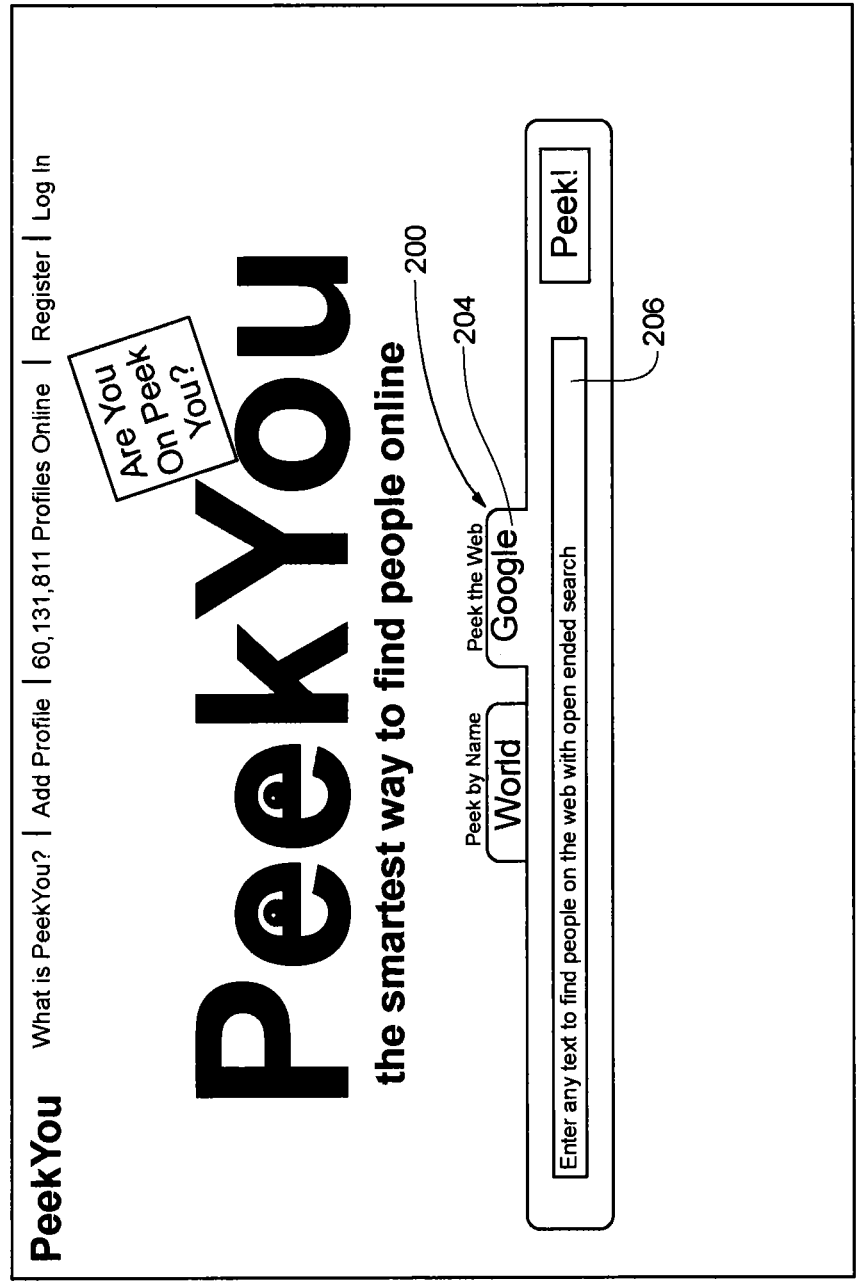
FIG. 10 is a graphical representation of a client-side interface to add functionality according to an embodiment of the present invention.

Referring to FIG. 10, in one embodiment of the present invention, additional client-side interfaces 200 that relate information contained in the DPIAS 100 to other online applications may be embedded into a webpage 202. A client-side interface that relates Internet user information contained in the DPIAS 100 is cross-referenced with search results returned by a search application programming interface (API) 204, such as Google™ Custom Search API.

Figure 11:
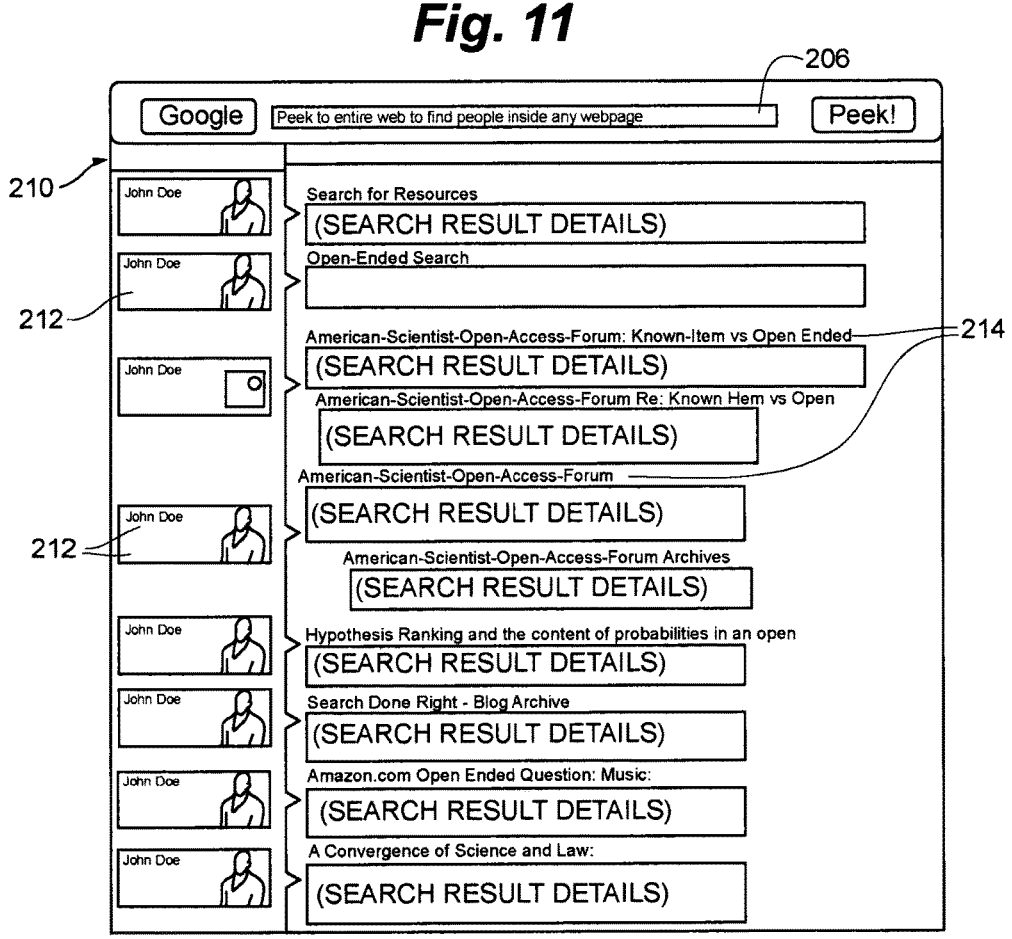
FIG. 11 is a graphical representation of a distributed personal information aggregation system overlay, according to an embodiment of the present invention.

Referring to FIG. 11, in one embodiment, an end-user may enter in a search term in the relevant search field 206 and obtain an overlayed result list 210 that utilizes Google™ Custom Search API for search results and is overlayed with information retrieved from the DPIAS 100. In one embodiment of the present invention, each link displayed in the overlay results list 210 relates a personal profile 212 returned from the DPIAS 100 to each result 214. In another embodiment of the present invention more than one personal profile 212 is related to each search result if more than one Internet user is associated with that result as determined by DPIAS 100. Thus, standard search results are enhanced to incorporate user information for each result in a result list.

One having skill in the art will appreciate that additional client-side interfaces that overlay information contained in the DPIAS 100 over data returned from external API requests may be developed. Client-side interfaces may be developed for, but are not limited to, Amazon®, Yahoo®, MSN/Live®, Wikipedia® and eBay®. These additional client-side interfaces may give end-users information about authors of books and articles or sellers or producers of goods in online marketplaces. In addition, a person having skill in the art will appreciate that the client-side interface is flexible enough to accommodate a variety of client-side interface designs. Further, a person having skill in the art will appreciate that the client side interfaces will accommodate a variety of revenue-generating applications such as advertisement or sponsored search.

Figure 12:
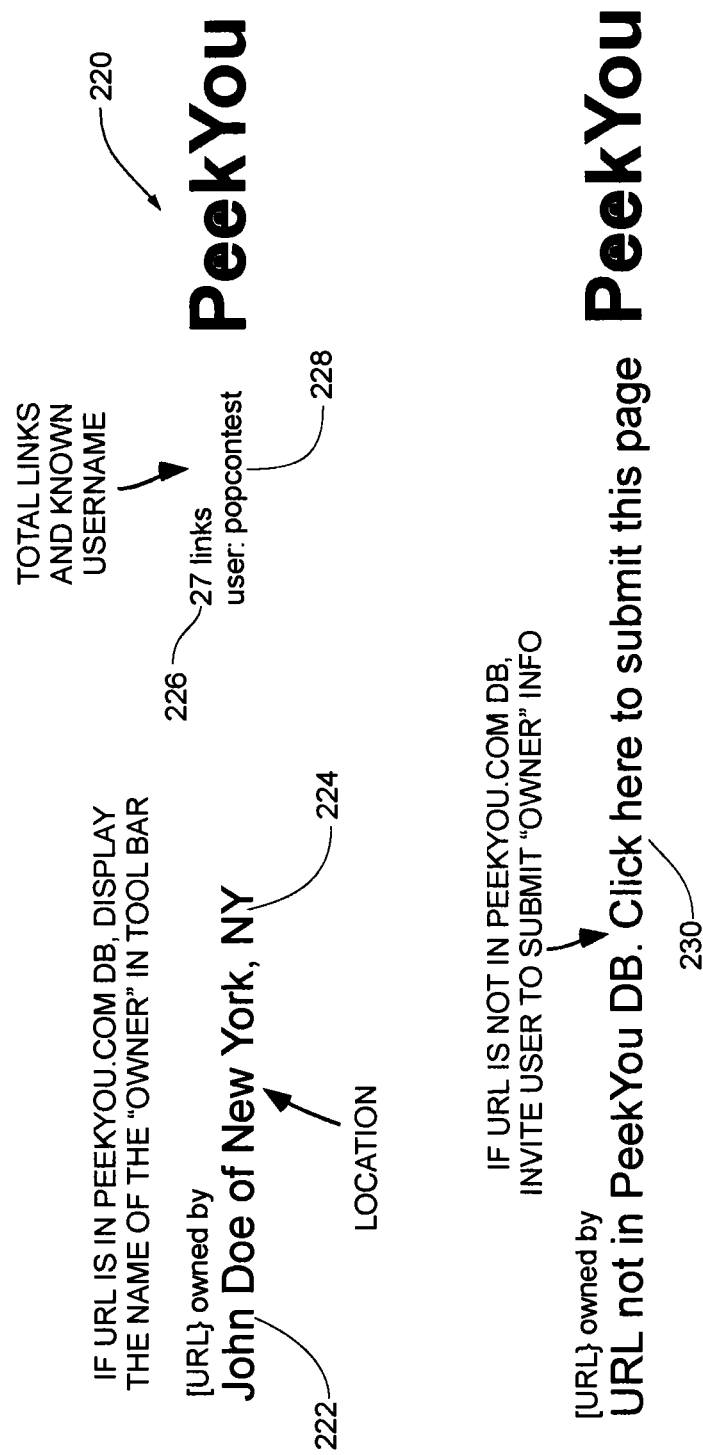
FIG. 12 is a graphical representation of a distributed personal information aggregation system toolbar, according to an embodiment of the present invention.
Figure 13:
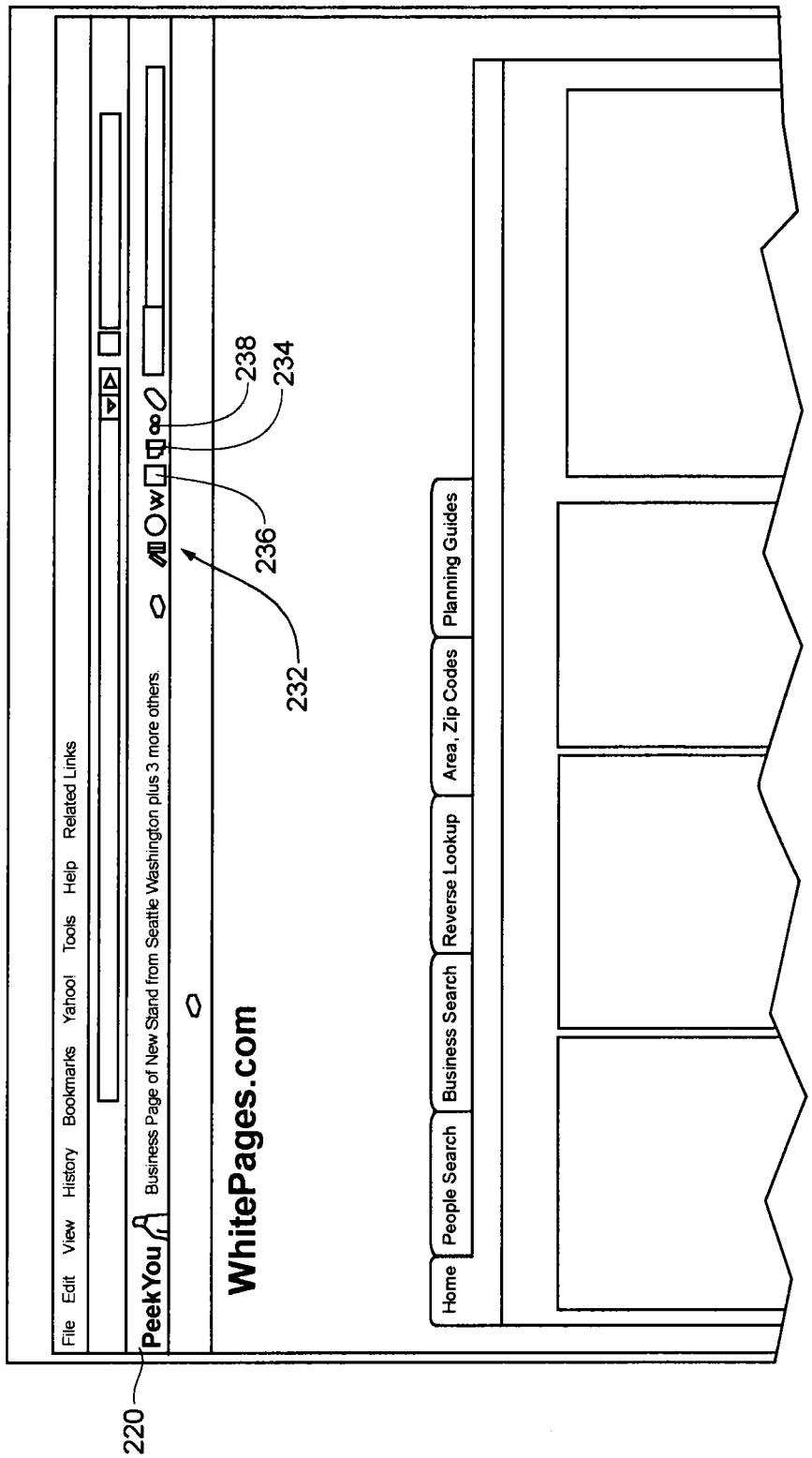
FIG. 13 is a graphical representation of a distributed personal information aggregation system toolbar embedded in a personal web browser, according to an embodiment of the present invention.

Referring to FIGS. 12 and 13, in one embodiment of the present invention, additional programs may be created to heighten the ease of obtaining information contained in the DPIAS 100. A web browser toolbar 220 may be created that associates a current URL to ownership information in the DPIAS 100. Thus, in one embodiment of the invention, an end-user may surf the web utilizing their normal search-and-browse behavior, but obtain associated ownership information for currently-viewed webpages. In one embodiment, the DPIAS 100 will return information such as the associated owner's name 222, location 224 total links to the current webpage 226 and username 228 for display in the toolbar 220. In another embodiment, the toolbar will not have any associated information, but will allow for the end-user to provide that information through a navigable interface element 230. In another embodiment of the present invention the toolbar 220 may include graphical icons 232 that enable quick navigation to the associated owner's other known URLs. The quick navigation links in the toolbar may include, but are not limited to, MySpace® 234, LinkedIn® 236 and Flickr™ 238.

Figure 14:
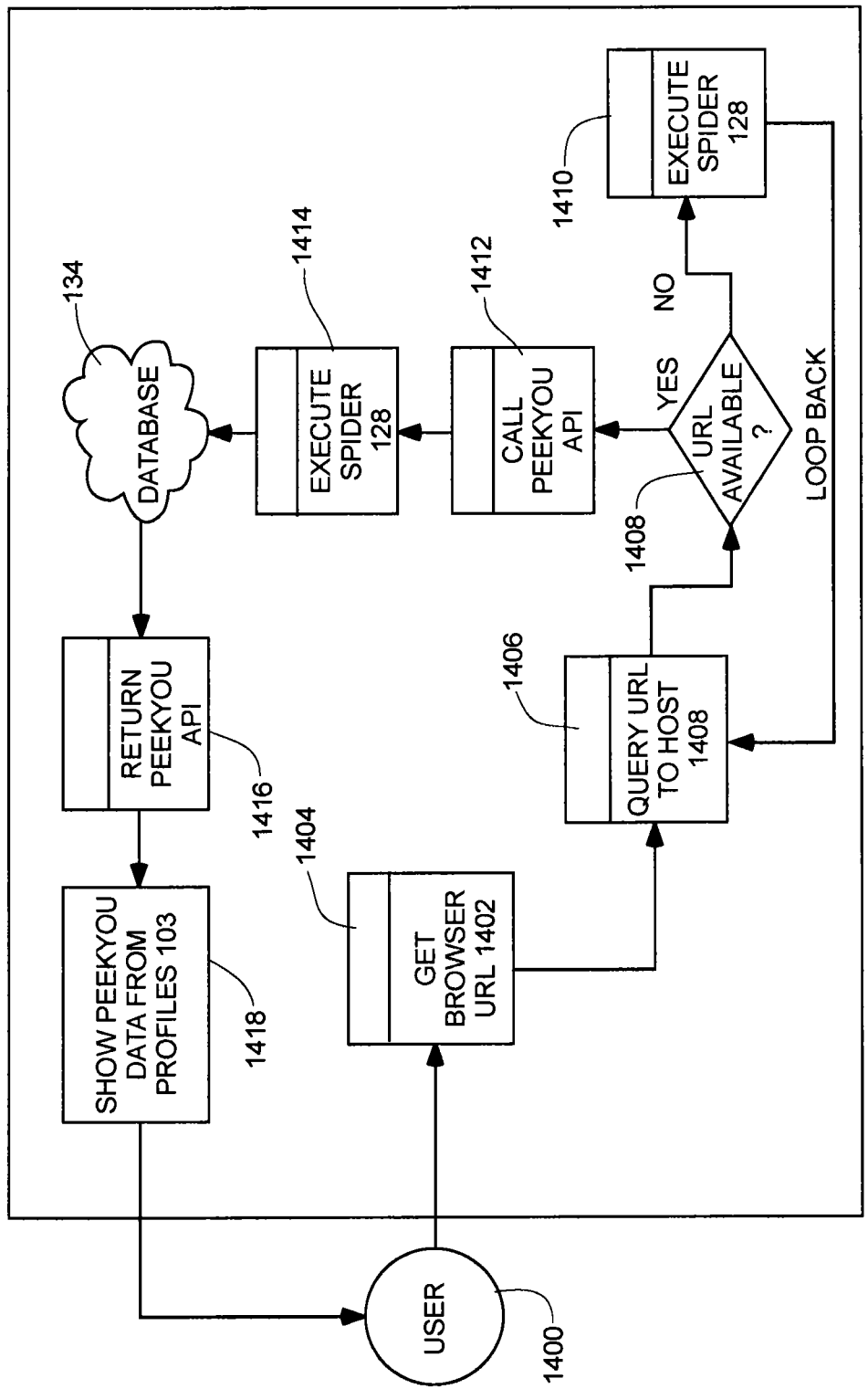
FIG. 14 is a flowchart of a process for integrating an Internet browser with the system of FIG. 1, according to an embodiment of the present invention.

Referring to FIG. 14, in an embodiment similar to that described with respect to FIGS. 12 and 13, DPIAS 100 may be integrated into an Internet browser, such that a user may retrieve and view information from profiles 103. As described below, integration may be accomplished through the use of an API comprising an instruction set stored in a memory device at DPIAS 100, and that ties the Internet browser to database 134, and presents data of profiles 103 to a user 1400.

As depicted in the flowchart of FIG. 14, user 1400 uses an Internet browser to view content at a website having a URL 1402, and the URL is obtained at step 1404. At step 1406, URL 1402 is queried to host 1408.

At step 1450, if URL 1410 is not found at database 134 of host 1440, spider manager 128 is executed to attempt to identify and locate individual people who own or are related in a professional manner to the given URL 1410 from the Internet, so that data linking persons to URL 1410 may be added to database 134 via the systems and processes described above, and via steps 1412 and 1414.

When URL 1410 becomes available and relevant data and profiles 103 stored in database 134, data and information relating to profiles 103 of database 134 may be returned and displayed to user 1400 via steps 1416 and 1418.

Referring to FIG. 15, in one embodiment of the present invention, a messaging client-side interface 250 enables communication between persons with information contained within DPIAS 100. In one embodiment of the present invention the end-user searches for a person utilizing a client-side interface 140, selects a user profile from the result list 160. The user profile 180 may incorporate a "contact me" navigable link that displays the messaging client-side interface 250. In one embodiment of the present invention the end-user will enter in personal information 252 to enable communication with the person identified in the selected personal profile 180. Information 252 entered into the messaging client-side interface 250 may include, but is not limited to, first name 254, middle name 256, last name 258, email address 260, homepage 262, location 264, city/state 266, gender 268, age 270, relationship 272 and message to be communicated 274. In one embodiment of the present invention the personal information 252 is matched to information already in the DPIAS 100, or a new user bucket 102 is created to contain the end-user entered personal information 252. One having skill in the art will appreciate that any number of fields may be placed on the client-side messaging interface screen to enable further information gathering.

Figure 16:
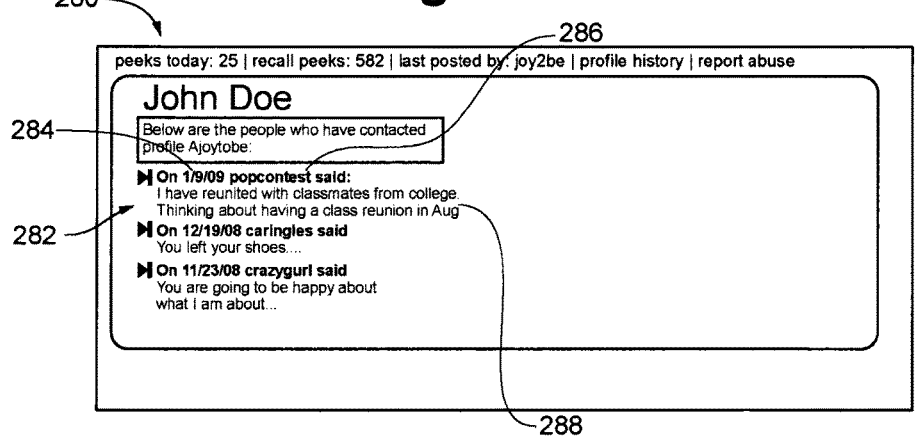
FIG. 16 is a graphical representation of a personal messaging system history, according to an embodiment of the present invention.

Referring to FIG. 16, in one embodiment of the present invention, the user profile may incorporate a messaging history client-side interface 280. The messaging history client side interface 280 may contain a viewable history of all messages 282 submitted to be delivered to the selected personal profile 180. The viewable history 282 may include, but is not limited to, information as to the date sent 284, sender 286 and message 288. In another embodiment of the present invention an end-user may find their personal profile 180 by utilizing the client-side interface 140 and search result list 160 and then navigate to the messaging history client-side interface 280 to view messages directed to them.

Figure 17:
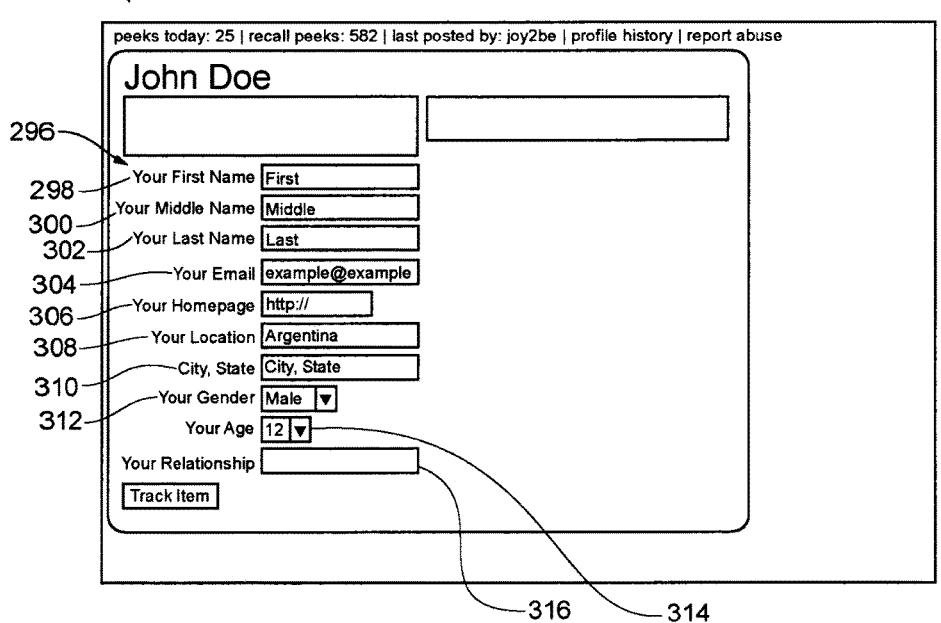
FIG. 17 is a graphical representation of a personal profile tracking system, according to an embodiment of the present invention.
Figure 18:
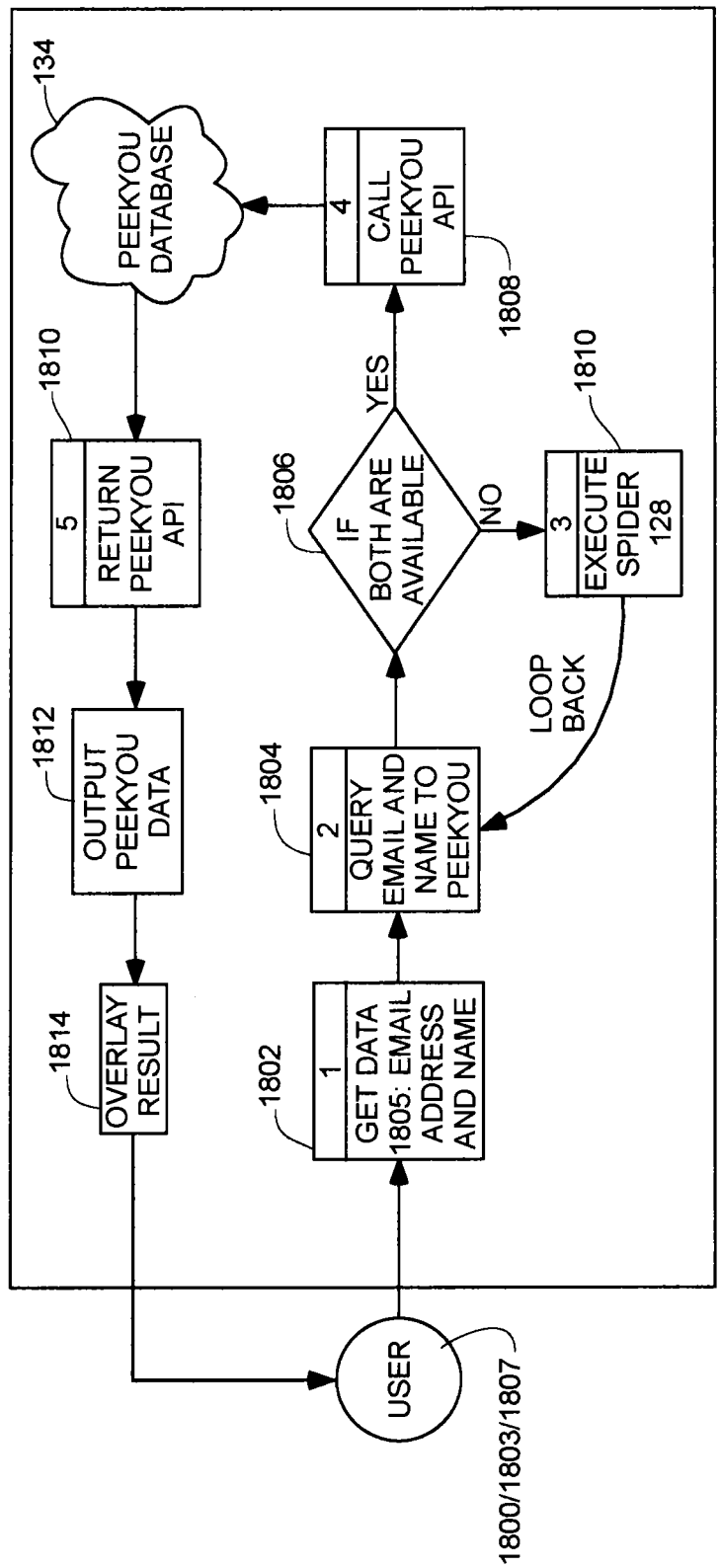
FIG. 18 is a flowchart of a process for integrating an e-mail system with the system of FIG. 1, according to an embodiment of the present invention.

Referring to FIG. 17, in one embodiment of the present invention, an end-user may utilize a change-tracking client-side interface 294 to view persons tracking personal profile 180 changes and to set up a profile tracking request. The profile tracking request may require submission of personal information 296. Personal information 296 entered into the change-tracking client-side interface 294 may include, but is not limited to, first name 298, middle name 300, last name 302, email address 304, homepage 306, location 308, city/state 310, gender 312, age 314, and relationship 316. In another embodiment the change-tracking client-side interface 294 may include a track-list 318 that displays other people who are currently tracking the selected personal profile 180.

Referring to FIG. 17, in one embodiment of the present invention, DPIAS 100 may be integrated into an e-mail system. In this embodiment, DPIAS 100 integrates public web data, or profiles 103 in database 134 directly with e-mail programs, for example, Microsoft Outlook or Google Gmail™. When reading an e-mail, the email system would cross-reference an incoming e-mail address and sender's name with database 134. DPIAS 100 would then display within the e-mail system more information on the sender, such as photos, links, and so on. This may be possible for any mobile, desktop or web-based e-mail application.

More specifically, user 1800 utilizes an e-mail system 1803 to send and receive e-mail messages from an e-mail server 1807 that include sender and receiver names and e-mail addresses. At step 1802, DPIAS 100 obtains e-mail data 1805 comprising a sender's e-mail address and name as received by receiving user 1800.

At steps 1804 and 1806, data 1805 is queried by user 1800 operating a user computer or internet-enabled device connected to database 134 via the Internet to see if both name and e-mail address comprising data 1805 are found in database 134. If not available, DPIAS 100 via spider manager 128 spiders the Internet to find information relating to data 1805 such that a profile 103 may be created in database 134.

When data 1805 becomes available, DPIAS is called up at step 1808. Step 1808 may comprise a user computer connecting to a hosted API server thereby causing a saved set of instructions to be executed, such that an API is called up to connect user 1800 to database 134 via the API.

At step 1810, the API of DPIAS 100 is returned to the client computer such that data of profiles 103 matching the name and address of the sender of the e-mail is output from the API, and displayed at step 1814 using an overlay to the e-mail system.

Figure 19:
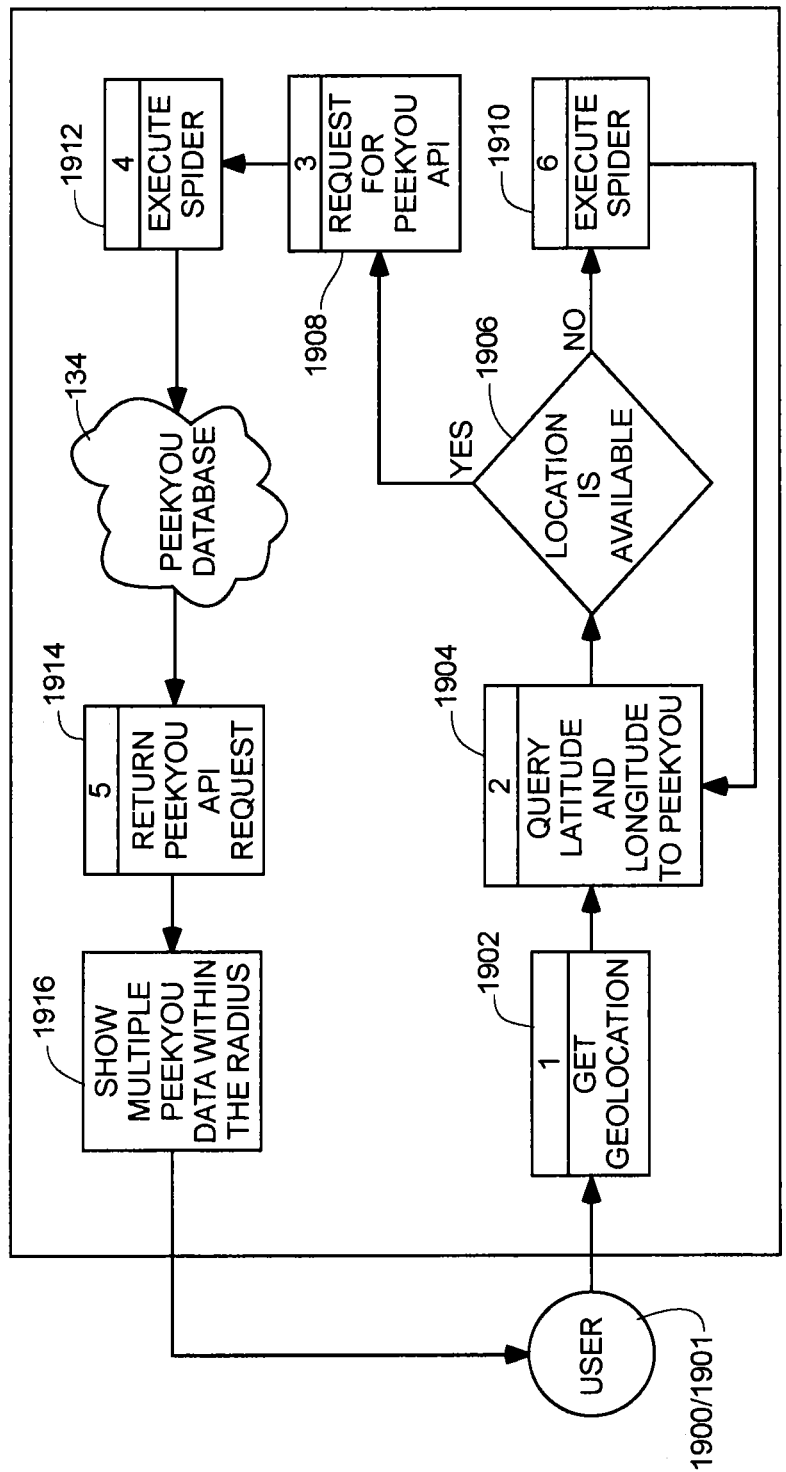
FIG. 19 is a flowchart of a process for integrating a geographic location device with the system of FIG. 1, according to an embodiment of the present invention.

Referring to FIG. 19, in one embodiment, DPIAS 100 is integrated with a geographic location device to provide static and dynamic profile 103 information relating to particular locations. In one embodiment, DPIAS 100 is integrated into a GPS device, or GPS enabled cell phone, delivering dynamic profile 103 information relating to an immediate location. For example, a user 1900 may be walking down a street using a GPS-enabled cell phone, while DPIAS 100 provides profile 103 data for people and their attributes that may be "nearby." Nearby addresses, links associated with locations, images of locations nearby, RSS feds, and other information tied to a particular location or area may be fed to the GPS enable cell phone or device.

In another embodiment, DPIAS 100 may be integrated into non-mobile Internet enabled devices having known locations, such as Internet-enabled kiosks and monitors located in, for example, stores, bars, subways, and so on. In such an embodiment, DPIAS 100 provides profile 103 information relating to the particular location FIG. 19 depicts a flowchart of an embodiment for integrating a geographic location and/or geolocational device with DPIAS 100. A user 1900 operates device 1901 having a known geographic location. As described above, device 1901 may be a GPS-enabled mobile telephone, a GPS device, computer with a known location, or other device having a known location, and potentially connected to the Internet.

At step 1902, a geographic location is obtained from device 1901 by DPIAS 100, via an Internet connection. At step 1904 the geographic location is queried to database 134. In one embodiment, the geographic location is a specific longitude and latitude pair. In other embodiments the geographic location may define a neighborhood, town, city, county, region, or other defined area.

At step 1906, if the geographic location and associated profiles 103 are already found within database 134, a request for an API of DPIAS 100 may be made at step 1908. If not, spider manager 128 of DPIAS 100 spiders the Internet at step 1910 in search of data 340 to add to profiles 103 of database 134. When a geographic location and associated profiles 103 found, a request for an API of DPIAS is made at step 1910. At step 1912, additional spidering may be accomplished via step 1912 to further enhance the quantity and quality of profiles 103 data available for the geographic location.

At step 1914, the API request is returned, and data and information of profiles 103 at the location, or within a defined radius or area surrounding the location, are displayed, or otherwise made available, to device 1901. Examples of geo-tagged output relating to a specific profile 103 within a given radius may include the most recent blog posts within a user's given location, web-based photos belonging to a person of a profile 103 within a defined radius from where the user is located, or a homepages belonging to people of profiles 103 within a defined radius from the user. In another embodiment, DPIAS 100 may be used to cross-reference a public URL or web-link to a specific person, link a public image URL to a specific person, or an RSS feed to a specific person. Further, such links, photos, and RSS feeds that are geo-tagged may be linked to a specific person based on location.

In yet another embodiment, DPIAS 100 may comprise an overlay to identify and display information of profiles 103 with a specific URL. For example, DPIAS may be used to list all people who are associated in some way with a domain name, using the systems, apparatuses, and methods described above. In another example, DPIAS 100 may integrated with a Whois database or website, for example, http://www.whois.net, to provide publicly available information to the standard whois output. The additional information provided may include photos, links, tags, and so on.

In another embodiment of the present invention, DPIAS 100 integrates database 134 with other commercial databases or lists of persons.

In one such embodiment, database 134 is cross-referenced to a phone bank or call center database such that a phone marketer is able to pull up public information from profiles 103 of database 134 of a particular person from the call center database, while speaking with that same person. Having instant access to such information may provide the caller with valuable background information on whom he or she is speaking with, providing added context which may generate measured improvements in customer satisfaction and sales.

In another such embodiment, database 134 is cross-referenced with direct marketing lists, allowing more context for markets to create online and offline targeted campaigns. Further, augmenting the information companies possess on actual or potential customers could prove valuable for direct marketing efforts.

Similarly, news organizations may provide more context on the stories they write by providing images, links, and so on, as well as hyper-linking data and information from database 134 to the names of the specific people referenced in their articles.

In another application, DPIAS 100 and database 134 may be used to cross-reference public campaign donation databases with profiles 103, thereby augmenting existing database with additional valuable campaign information.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of indexing information available from public sources over a network and corresponding to a person via a personal information aggregation system that includes a first server, a processor, and a database of profiles stored in a memory device, comprising:

receiving at the first server, data associated with a person, the data associated with the person being publicly available over a network and including name data comprising at least a first name and a last name and including other data;

using the processor to determine whether the other data includes a unique item of information associated with the person, and when the other data includes a unique item of information associated with the person, performing the steps of:

querying the database of profiles, the database of profiles including a plurality of data profiles, each of the data profiles having data corresponding to a previously-profiled person, to determine whether the name data and unique item of information of the data associated with the person match name data and a unique item of information of one of the plurality of data profiles of the database of profiles;

merging the data associated with the person with the one of the plurality of data profiles when both the name data and unique item of information of the data associated with the person match the name data and the unique item of information of the one of the plurality of data profiles;

determining whether the other data includes a location when the unique item of information associated with the person does not match the unique item of information of the one of the plurality of data profiles, and when the other data does not include a location, create a partial-profile data record including the name data and the other data, and when the other data does include a location and the name data matches the name data of the one of the plurality of data profiles, perform the steps of:

querying the database of profiles to identify data profiles having name data that matches the name data of the person, and having a location that is in a geographic vicinity of the location of the other data; and merging the data associated with the person with an identified data profile having name data that matches the name data of the person, and having a location that is in the geographic vicinity of the location of the other data, thereby indexing publicly-available information of the person; and calculating a frequency for instances of the name data having a location within a distance threshold of the geographic vicinity and wherein merging the data associated with the person with an identified data profile having name data that matches the name data of the person, and having a location that is within the distance threshold of the location of the other data comprises only merging the data associated with the person with an identified data profile having name data that matches the name data of the person, and having a location that is within the distance threshold of the location of the other data when the frequency is less than a predetermined threshold, otherwise creating and storing a new data profile including the name data and other data for the person.

2. The method of claim 1, further comprising creating a partial-profile data record including the name data and the other data and storing the partial-profile data record in a database of a server when the other data does not include a unique item of information associated with the person.

3. The method of claim 1, wherein the unique item of information is selected from a group comprising a location, an e-mail address, and a telephone number.

4. The method of claim 1, wherein in the absence of an identified data profile having name data that matches the name data of the person and having a location that is in the vicinity of the location of the other data, creating and storing a new data profile including the name data and other data for the person.

5. The method of claim 1, wherein the location is selected from the group comprising a street address, a city, a county, a state, a country, and a latitude and longitude coordinate.

6. The method of claim 1, wherein the vicinity of the location of the other data comprises a predetermined distance from the location of the other data.

7. The method of claim 6, wherein the predetermined distance is greater for name data having a high frequency of occurrence.

8. The method of claim 1, wherein a geographic area of the vicinity of the location of the other data varies directly with the frequency of occurrence of the name data, such that relatively more unique name data corresponds to a relatively smaller geographic area and relatively less unique name data corresponds to a relatively larger geographic area.

9. The method of claim 1, further comprising comparing the data associated with the person to the identified data profile and calculating a numeric indication of a relative match strength between the data associated with the person and the identified data profile, and merging the data associated with the person with the identified data profile only if the numeric indication meets or exceeds a predetermined threshold value.

10. A method of indexing information available from public sources over a network and corresponding to a person via a personal information aggregation system that includes a personal information aggregation system that includes a first server, a processor, and a database of profiles stored in a memory device, comprising:

receiving at the first server, data associated with a person, the data associated with the person being publicly available over a network and including name data comprising at least a first name and a last name and including other data;

using the processor to determine whether the other data includes a unique item of information associated with the person, and when the other data includes a unique item of information associated with the person, performing the steps of:

querying the database of profiles, the database of profiles including a plurality of data profiles, each of the data profiles having data corresponding a previously-profiled person, to determine whether the name data and unique item of information of the data associated with the person match name data and a unique item of information of one of the plurality of data profiles of the database of profiles;

merging the data associated with the person with the one of the plurality of data profiles when both the name data and unique item of information of the data associated with the person match the name data and the unique item of information of the one of the plurality of data profiles;

determining whether the other data includes a location when the name data and unique item of information associated with the person do not match the name data and unique item of information of the one of the plurality of data profiles, and when the other data does not include a location, creating a partial-profile data record including the name data and the other data;

querying the database of profiles to identify data profiles having name data that matches the name data of the person, and having a location that is in a geographic vicinity of the location of the other data;

merging the data associated with the person with an identified data profile having name data that matches the name data of the person, and having a location that is in the geographic vicinity of the location of the other data; and calculating a frequency for instances of the name data having a location within a distance threshold of the geographic vicinity, and wherein merging the data associated with the person with an identified data profile having name data that matches the name data of the person, and having a location that is within the distance threshold of the location of the other data comprises only merging the data associated with the person with an identified data profile having name data that matches the name data of the person, and having a location that is within the distance threshold of the location of the other data when the frequency is less than a predetermined threshold, otherwise creating and storing a new data profile including the name data and other data for the person.

11. The method of claim 10, wherein the vicinity of the location of the other data comprises a predetermined distance from the location of the other data.

12. The method of claim 10, further comprising creating a partial-profile data record including the name data and the other data and storing the partial-profile data record in a database of a server when the other data does not include a unique item of information associated with the person.

13. The method of claim 10, wherein the unique item of information is selected from a group consisting of a location, an e-mail address, and a telephone number.

14. The method of claim 10, wherein the location is selected from the group consisting of a street address, a city, a county, a state, a country, and a latitude and longitude coordinate.

15. The method of claim 10, further comprising comparing the data associated with the person to the identified data profile and calculating a numeric indication of a relative match strength between the data associated with the person and the identified data profile, and merging the data associated with the person with the identified data profile only if the numeric indication meets or exceeds a predetermined threshold value.

16. A method of searching for personal information available from public sources over a network, comprising:
    receiving at a client computer search-request data associated with a person;
    transmitting from the client computer over a network, a request to search for personal information associated with the person to a personal information aggregation system, the search request including the search-request data associated with the person;
    receiving at the client computer search-result data transmitted from the personal information aggregation system in response to the search request, the search result data including the personal information associated with the person, and retrieved from a database of the personal information aggregation system, the personal information aggregation system including a first server, a processor, and the database stored in a memory device, and configured to create and store the database by implementing the steps of:
        receiving at the first server, data associated with the person, the data associated with the person being publicly available over a network and including name data comprising at least a first name and a last name and including other data;
        using the processor to determine whether the other data includes a unique item of information associated with the person, and when the other data includes a unique item of information associated with the person, performing the steps of:
            querying the database including a plurality of data profiles, each of the data profiles having data corresponding a previously-profiled person, to determine whether the name data and unique item of information of the data associated with the person match name data and a unique item of information of one of the plurality of data profiles of the database of profiles;
            merging the data associated with the person with the one of the plurality of data profiles when the name data and unique item of information of the data associated with the person match the name data and the unique item of information of the one of the plurality of data profiles;
        determining whether the other data includes a location when the name data and unique item of information associated with the person do not match the name data and unique item of information of the one of the plurality of data profiles, and when the other data does not include a location, creating a partial-profile data record including the name data and the other data, and when the other data does include a location and the name data matches the name data of the one of the plurality of data profiles, perform the steps of:
            querying the database of profiles to identify data profiles having name data that matches the name data of the person, and having a location that is in a geographic vicinity of the location of the other data; and
            merging the data associated with the person with an identified data profile having name data that matches the name data of the person, and having a location that is in the geographic vicinity of the location of the other data, thereby indexing publicly-available information of the person;
        calculating a frequency for instances of the name data having a location within a distance threshold of the geographic vicinity and wherein merging the data associated with the person with an identified data profile having name data that matches the name data of the person, and having a location that is within the distance threshold of the location of the other data comprises only merging the data associated with the person with an identified data profile having name data that matches the name data of the person, and having a location that is within the distance threshold of the location of the other data when the frequency is less than a predetermined threshold, otherwise creating and storing a new data profile including the name data and other data for the person.

17. The method of claim 16, further comprising displaying at the client computer the computer search-result data transmitted from the first server of the personal information aggregation system in response to the search request.

18. The method of claim 17, wherein the displayed search-result data is displayed as an e-mail overlay.

19. The method of claim 16, wherein the request to search for personal information associated with the person to a personal information aggregation system is automatically generated based on a user inputting name data into the client computer.

* * * * *